United States Patent
Tremblay et al.

(10) Patent No.: US 8,366,794 B2
(45) Date of Patent: Feb. 5, 2013

(54) APPARATUS AND METHOD FOR BIO-FUEL PRODUCTION

(75) Inventors: André Yves Tremblay, Ottawa (CA); Marc Arnold Dubé, Ottawa (CA)

(73) Assignee: The University of Ottawa, Ottawa, Ontario (CA)

( * ) Notice: Subject to any disclaimer, the term of this patent is extended or adjusted under 35 U.S.C. 154(b) by 1081 days.

(21) Appl. No.: 11/817,206

(22) PCT Filed: Feb. 27, 2006

(86) PCT No.: PCT/CA2006/000286
§ 371 (c)(1),
(2), (4) Date: Aug. 27, 2007

(87) PCT Pub. No.: WO2006/089429
PCT Pub. Date: Aug. 31, 2006

(65) Prior Publication Data
US 2008/0250700 A1 Oct. 16, 2008

Related U.S. Application Data

(60) Provisional application No. 60/656,372, filed on Feb. 28, 2005.

(51) Int. Cl.
*C10L 1/18* (2006.01)
*B01J 10/00* (2006.01)

(52) U.S. Cl. .............. 44/385; 422/129; 554/1; 554/174

(58) Field of Classification Search .............. 44/301, 44/437, 385; 554/174, 1; 422/129, 187
See application file for complete search history.

(56) References Cited

U.S. PATENT DOCUMENTS

| | | | |
|---|---|---|---|
| 2,383,580 | A | 8/1945 | Clarence et al. |
| 4,229,297 | A | 10/1980 | Nohmi et al. |
| 4,655,927 | A | 4/1987 | Ford |
| 5,972,057 | A | 10/1999 | Hayafuji et al. |
| 6,262,285 | B1 | 7/2001 | McDonald |
| 6,620,958 | B2 | 9/2003 | Buchanan et al. |
| 7,622,600 | B1 | 11/2009 | Marr |
| 2002/0013486 | A1* | 1/2002 | Ergun et al. ............... 554/174 |
| 2006/0063242 | A1* | 3/2006 | Chou ......................... 435/135 |

FOREIGN PATENT DOCUMENTS

| CN | 1648207 | 8/2005 |
|---|---|---|
| WO | 2004/048311 | 6/2004 |

OTHER PUBLICATIONS

European Patent Application No. EP 06705240: EESR dated Feb. 24, 2009.
Canadian Patent Application No. 2,599,499, Office Action dated Sep. 20, 2012.
International Patent Application No. PCT/CA2006/000286, Search Report dated Jun. 13, 2006.

* cited by examiner

*Primary Examiner* — Cephia D Toomer
*Assistant Examiner* — Pamela H Weiss
(74) *Attorney, Agent, or Firm* — Kathleen E. Marsman; Borden Ladner Gervais LLP

(57) ABSTRACT

An apparatus for the production of a bio-fuel or a bio-fuel additive from plant-derived oils, animal fats or a mixture thereof, suitable for use in a diesel engine is disclosed. The apparatus comprises a porous membrane for separating a reaction mixture from a permeate, the reaction mixture comprising an alcohol, a feedstock comprising plant-derived oils, animal fats or mixture thereof, and a catalyst for converting said feedstock to a bio-fuel or a bio-fuel additive, wherein said porous membrane is substantially impermeable to the feedstock and substantially permeable to said bio-fuel or bio-fuel additive. A method using said porous membrane in the production of a bio-fuel or a bio-fuel additive is also disclosed.

19 Claims, 13 Drawing Sheets a)

b)

APPARATUS AND METHOD FOR BIO-FUEL PRODUCTION

FIELD OF THE INVENTION

The invention relates to the field of apparatuses and methods for the production of fuels and fuel additives. In particular, the invention relates to the production of fuels and fuel additives suitable for use in a diesel engine.

BACKGROUND TO THE INVENTION

Diesel engines may be powered by a variety of fuels, including those derived from petroleum sources, and well as renewable sources. For example, efforts have been made to dissolve alcohols such as ethanol in petroleum-based diesel fuel. In other examples, diesel fuels may be derived from lipid sources such as, for example, vegetable oils, animal fats and waste frying oils. In such cases various components of the oil source may be converted into products suitable for combustion within a diesel engine. For example, fatty acid methyl esters (FAME) may be derived from vegetable oils, animal fats and waste frying oils to produce "biodiesels" suitable for use in a diesel engine either with or without other additives. In other examples, such biodiesel products may be mixed with petroleum-based diesel fuels to generate a biodiesel/regular diesel fuel blend.

The advantages of biodiesel over petroleum-based diesel fuel are well known to those in the art. For example, biodiesel may be generated from a more easily renewable source, be more amenable to biodegradation, and may allow for combustion with lower quantities of pollutants. However, the costs of producing biodiesel exceed the costs of producing diesel from petroleum sources. For biodiesel of any type to present an economically viable alternative to petroleum-based biodiesel, apparatuses and methods are required to improve the efficiency of biodiesel production.

SUMMARY OF INVENTION

It is one object of the present invention, at least in preferred embodiments, to provide an apparatus for production of a fuel suitable for use in a diesel engine.

It is another object of the invention, at least in preferred embodiments, to provide a method of producing a fuel suitable for use in a diesel engine.

In one aspect of the invention there is provided an apparatus for producing a fuel or fuel additive suitable for use in a diesel engine, the apparatus comprising:

a porous membrane for separating a reaction mixture from a permeate, the reaction mixture comprising an oil-in-alcohol emulsion and a catalyst for converting oil in said oil-in-alcohol emulsion to products including said fuel or fuel additive;

wherein said fuel or fuel additive is substantially miscible in said alcohol, said porous membrane being substantially impermeable to oil droplets in said emulsion, and substantially permeable at least to said fuel or fuel additive, and optionally to said alcohol.

In another aspect of the invention there is provided a method for generating a fuel or fuel additive suitable for use in a diesel engine, the method comprising the steps of:

providing a porous membrane;

placing a reaction mixture on a reaction mixture side of the porous membrane, the reaction mixture comprising an oil-in-alcohol emulsion and a catalyst for converting oil in said oil-in-alcohol emulsion to products including said fuel or fuel additive, said fuel or fuel additive being substantially miscible in said alcohol, said porous membrane being substantially impermeable to oil droplets in said emulsion, and substantially permeable at least to said fuel or fuel additive and optionally to said alcohol; and causing at least said fuel or fuel additive to permeate said porous membrane to form a permeate on a permeate side of said porous membrane opposite said reaction mixture side.

DEFINITIONS

Figure 1:
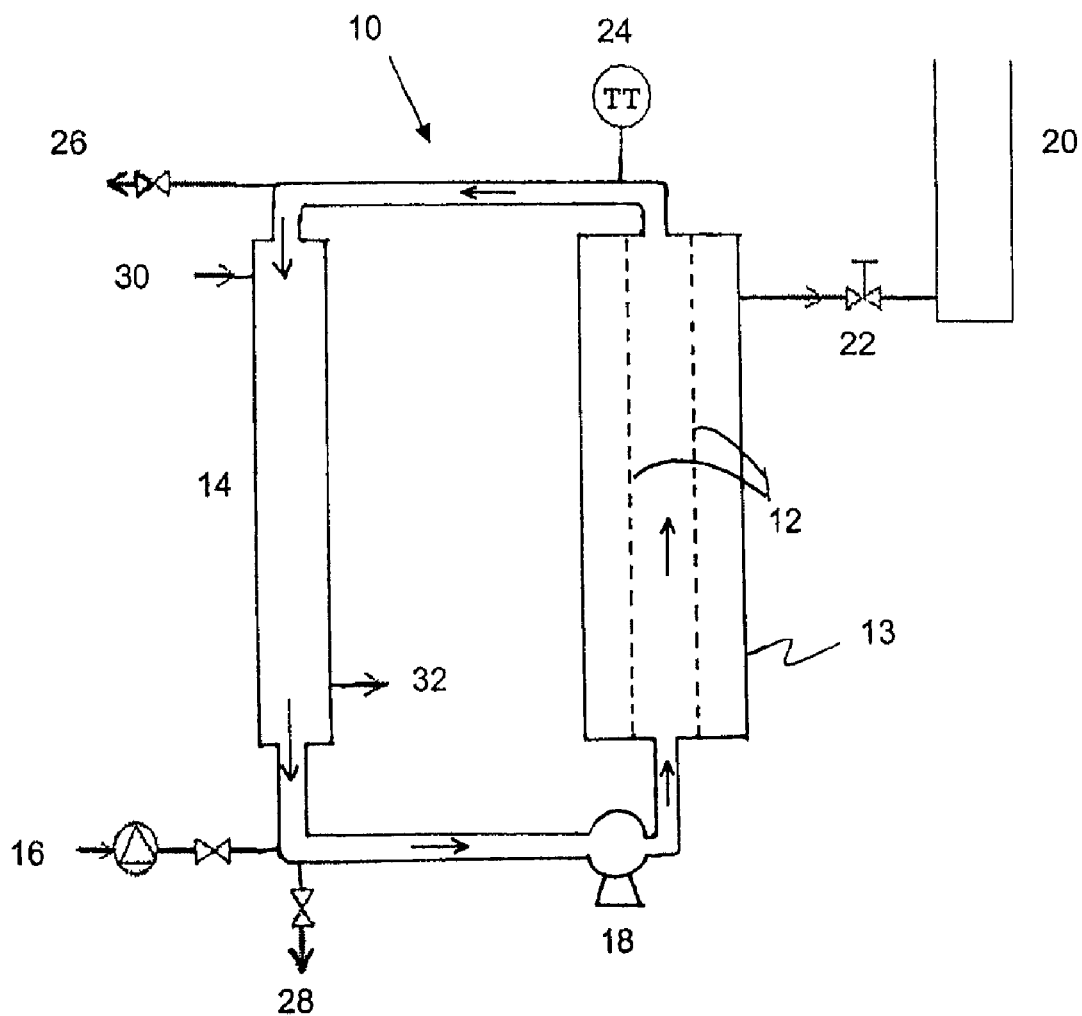
FIG. 1 is a schematic diagram of an exemplary apparatus of the invention.

Apparatus/membrane reactor: refers to any apparatus as described herein for generating a fuel or fuel additive in accordance with the teachings of the present application.

Biodiesel: refers to any fuel or fuel additive generated by the apparatus or methods of the present invention, suitable for use in powering or assisting in powering or providing internal combustion to a diesel engine.

Emulsion: refers to any mixture comprising an alcohol and an oil, wherein the oil forms droplets of oil in the alcohol due to the substantial immiscibility of the oil and alcohol.

Fuel or fuel additive: refers to any fuel suitable for powering a diesel engine, or any fuel additive suitable to add to one or more other components or fuels suitable for powering a diesel engine, to assist in the powering of a diesel engine.

Permeate: refers to any materials that have permeated across a porous membrane. For example, such materials may include, in selected embodiments, alcohol and/or reaction products from a reaction mixture such as FAAEs. Preferably, the permeate may be drawn off in a permeate stream and may, at least in selected embodiments, further include alcohol and/or or catalyst.

Permeate side: refers to any position on one side of a porous membrane, or upstream of a porous membrane, that includes a permeate. The expression permeate side is therefore intended to encompass a side of a porous membrane that includes a permeate. In addition, the expression permeate side includes any position adjacent or downstream of a porous membrane in a permeate stream that includes a permeate or components thereof.

Porous membrane/membrane: refers to any material that forms a selectively permeable barrier between a reaction mixture and a permeate. The membrane may take and suitable form or configuration, and comprise any material that includes pores of a suitable size to cause the required properties of selective permeability. In preferred embodiments, the membrane may be cylindrical or multi-lumen for insertion into a cylindrical module unit in fluid connection or a flat sheet in a plate and frame module with an input reaction mixture stream and output permeate stream. In preferred embodiments, a porous membrane may comprise one or more of sintered carbon, carbon graphite, ceramic, titanium oxide, aluminium, Teflon™, and stainless steel.

Module: refers to any component of an apparatus of the invention that includes a porous membrane, and contains or receives a reaction mixture or products thereof adjacent the porous membrane, such that permeation of selected reaction products through the membrane may occur as required. For example, a module may have an input line for receiving a reaction mixture stream, and also an output line for outputting a permeate stream. In other embodiments, a module may be adapted for use in a batch process. In most preferred embodiments, a module may take the form of a substantially cylindrical member in fluid communication with a reaction mixture stream and a permeate stream for use in a continuous process.

Oil: refers to any source of lipid or triglyceride materials suitable for use in an apparatus of the present invention. In preferred embodiments, oil may comprise one or more oil from lipid feedstock selected from the non-limiting group consisting of: virgin vegetable oils, vegetable oils, animals fats, palm oil, non-edible oils and waste frying oils.

Reaction mixture: refers to any mixture of catalyst and reactants suitable for the generation of a fuel or a fuel additive suitable for use in a diesel engine.

Reaction mixture side: refers to any position on one side of a porous membrane, or upstream of a porous membrane, that includes a reaction mixture. The expression reaction mixture side is therefore intended to encompass a side of a porous membrane that includes a reaction mixture such as for example in batch processes. In addition, the expression reaction mixture side includes any position adjacent or upstream of a porous membrane in a reaction mixture stream that includes a reaction mixture or components thereof.

Reservoir: refers to any means to contain, or hold a volume of one or more components of a reaction mixture, for example in a continuous loop of an apparatus of the invention. Such a reservoir may take any configuration or form.

In preferred embodiments a reservoir may comprise a pipe or tank having a larger lumen than pipes or tanks (perhaps in the order of several thousand liters) elsewhere in the apparatus. A tank may be closed (under pressure) or open to atmosphere. If the tank is open to atmosphere then a condenser may be fitted over the outlet to prevent vaporized alcohol from escaping.

DETAILED DESCRIPTION OF THE PREFERRED EMBODIMENTS

Through significant inventive ingenuity, the inventors have applied knowledge relating to membrane separation techniques to the production of biodiesel fuels. In preferred embodiments, the methods involve a continuous flow of reactants and products, which in most preferred embodiments further include recycling of selected materials. Although the invention will be described with specific reference to fatty acid alkyl ester (FAAE) and fatty acid methyl ester (FAME) production, it will be appreciated that the apparatuses and methods of the invention may be applied to any suitable substrates and reactants to achieve biodiesel production.

In preferred embodiments, an oil feedstock, based on either plant-derived oils or animal fats or mixtures of both, is fed via a pump to one side of a membrane reactor together with an alcohol and a catalyst to generate a reaction mixture. The oil feedstock undergoes a transesterification reaction with the alcohol in the presence of the catalyst to produce fatty acid alkyl esters (biodiesel) and glycerol. The biodiesel passes through the membrane pores to the other side of the membrane. Optionally, alcohol may also permeate the membrane. Since FAAE may be substantially miscible in alcohol, at least under the reaction conditions imposed, co-permeation of FAAE and alcohol may be expected in some embodiments. The membrane pores are sized to allow the biodiesel product, alcohol and the dissolved glycerol to pass through, but prevent the oil feedstock, which is immiscible in alcohol, from passing. Continuous removal of product from the reaction side of the membrane serves to improve yield, especially for equilibrium limited reactions. As well, shearing action from the feed pump may act to break up droplets of oil feedstock in the oil-alcohol emulsion, thereby increasing the surface area of oil available for the transesterification reaction.

An additional preferred feature of this invention is the retention of potentially stable emulsions formed as a result of byproduct soap formation and the removal of aggregate formation from the fatty acid alkyl ester permeate regardless of catalyst selection and the triglyceride source. This greatly improves the processability of a wide range of feed stock.

Fatty acid alkyl esters (FAAE) may be produced by transesterification (also known as alcoholysis) of vegetable oils and fats with an alcohol in the presence of a suitable catalyst. In addition, the process can yield glycerol. The general reaction scheme is shown in Reaction 1 below.

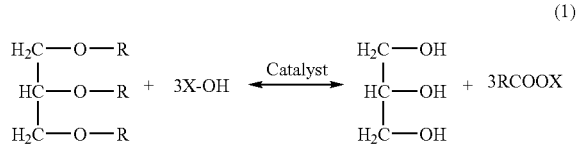

(1)

The conversion comprises three consecutive reversible reactions with diglyceride (DG) and monoglyceride (MG) as intermediate products. Following the reaction, glycerol may be separated by settling or centrifugation and may be purified for use in a desired application. For example, glycerol can be used in recently developed applications for animal feed, as carbon feedstock in fermentations, and as polymers, surfactants, intermediates and lubricants.

The transesterification reaction may be catalyzed by both homogeneous and heterogeneous catalysts as well as enzyme alkali and acid catalysts. The more commonly used alkali catalysts are sodium hydroxide, sodium methoxide and potassium hydroxide. More commonly used acid catalysts are sulphuric acid, hydrochloric acid and sulfonic acid. Heterogeneous catalysts include enzymes, titanium silicates, anion exchange resins and guanadines heterogenized on organic polymers.

Basic catalysts are the most commonly used as the process may be faster and the reaction conditions more moderate. However, their utilization with lower cost feedstock sources, such as animal fats and waste frying oil, which have a higher content of free fatty acids (FFA), in transesterification produces soaps by neutralizing the FFAs in the oil thus causing triglyceride saponification. Both soap formations are undesirable side-reactions because they partially consume the catalyst, decrease the biodiesel yield and complicate the separation and purification steps. As a result, additional steps to remove any water and either the FFA or soap from the reaction mixture are required. Commercial alkali catalyzed processes often employ an acid-catalyzed pre-esterification reactor to remove excess FFAs that cause soaps and stable emulsions leading to, in conventional processes, low FAAE recovery. Nonetheless, the apparatus and methods of the invention are, at least in preferred embodiments, adapted to reduce the effects of such problems.

Aside from the slow reaction rate, another drawback of the acid-catalyzed process is the requirement for the reactor to withstand an acidic environment. Nonetheless, an economic assessment carried out on four different continuous processes with different types of oil (virgin vs. waste) and catalysts (acid vs. alkali) showed that although the alkali-catalyzed process using virgin oil had the lowest capital investment cost, the cost of using virgin oil led to a higher total manufacturing cost (Zhang et al., 2003). When waste frying oil was used in the alkali-catalyzed process, a pre-treatment unit was required to reduce the content of the FFA. Thus, the cost associated with the pre-treatment unit offset the cost savings due to the use of waste frying oil.

Yet another drawback to the acid-catalyzed process, is that high alcohol to oil ratios are necessary to promote conversion of oil to FAAE. These higher amounts of alcohol increase the reactor size. However, recycling of the alcohol can mitigate some of the associated increases in cost. The issue of separating these substantial amounts of alcohol from the FAAE may become complicated and important.

A further issue that plagues FAAE production is the removal of residual TG and glycerol from the biodiesel product. One approach is to drive the reaction as close to complete conversion of the TG as possible. However, the transesterification of TG is an equilibrium reaction, and there are thus, limits to this approach. Other approaches employ water washing steps of the product stream, which can give rise to a challenging waste treatment problem in the wastewater stream.

Unreacted oils in biodiesel due to insufficient catalyst concentration and the presence of water in the feed stock is a major problem plaguing the industry. The retention of the oil phase in the reactor completely eliminates this problem as no unreacted oil passes through the membrane. In addition to this, vegetable oils can contain up to 2% unreactable organic substances that traditionally remain in the post reacted medium of a batch process. These must be further separated and can remain in the biodiesel product which causes quality problems. In the present invention, these organophilic substances are retained in the oil phase within the reactor and are not found in the FAAE permeate.

Miscibility is an important factor in biodiesel production. The conventional transesterification method results in a two-phase reaction which is, as a result, mass-transfer limited. More specifically, the vegetable oils and methanol are immiscible. The approach of many existing commercial enterprises has largely been focused on steps to enhance the reaction rate by attempting to overcome this immiscibility. For example, the addition of a co-solvent to generate a homogeneous reaction mixture can greatly enhance the reaction rate (Boocock et al., 1996, 1998). While this significantly enhances the reaction rate, the co-solvent must eventually be separated from the biodiesel and this requires additional processing. Considering that the reaction rate may not necessarily restrict process profitability, transesterification is an equilibrium reaction and downstream processing of the biodiesel is of utmost concern.

In direct contrast to previous processes for the production of FAAE the present invention takes advantage of the nature of the two phase transesterification reaction for converting triglyceride (TG) into fatty acid alkyl esters (FAAE). Specifically, the use of a membrane permeable to FAAE but not to TG in an emulsified form, allows for facilitated separation of the product and, at least in preferred embodiments, helps to drive the equilibrium of the reaction toward FAAE production.

As illustrated previously in reaction scheme 1, the reaction consists of transforming TG into FAAE, such as fatty acid methyl esters (FAME), in the presence of an alcohol (e.g. methanol, ethanol, propanol, butanol) and a catalyst (e.g. alkali, acid, enzyme), with glycerol as a major byproduct. In reaction scheme 1, X represents the alkyl group of the alcohol (e.g. $CH_3$ for methanol) while R represents a carbon chain typically, but not necessarily, of the order of 11 to 20 carbon atoms in length.

It has been determined that alcohol, for example methanol, is only slightly miscible with oils such as canola oil, and that temperature has only a slight effect on this miscibility. For all practical purposes, it may be said that the two phases are substantially immiscible. In contrast, FAAEs such as FAME are generally miscible in alcohols such as methanol over a broad range of temperatures. At normal reaction temperatures (e.g. 60° C.), FAME and methanol are miscible. Experimental evidence illustrating the above will be discussed in further detail in the Experimental section.

According to the present invention, the immiscibility of oil and alcohol presents an opportunity for improved production of FAAEs. By mixing alcohol and oil (in the presence of a suitable catalyst) to form an emulsion on one side of a permeable membrane allows for FAAE production. The emulsion may provide a high surface area for the oil/alcohol interface to improve the speed of FAAE production. Further, the membrane may comprise pores of a size sufficiently small to substantially prevent passage therethrough of oil-in-alcohol emulsion particles (i.e. oil droplets), yet sufficiently large to allow passage therethrough of FAAE reaction products. In this way; the production of FAAEs may be facilitated.

In preferred embodiments, the reaction may be carried out at an increased temperature relative to ambient temperature. This may improve the speed of the reaction as well as the flowability of the reactants and products.

In selected embodiments, the FAAE products may be drawn off from a side of the membrane opposite the side comprising the oil-in-alcohol emulsion (the "permeate side"). In other embodiments, the oil-in-alcohol emulsion may be under pressure. In any event, in preferred embodiments positive pressure on the oil-in-alcohol side of the membrane, or negative pressure on the other side of the membrane, may help facilitate passage or drawings of FAAE through the pores of the membrane thereby increasing the rate of FAAE production.

Membrane pore size may vary significantly, and yet still achieve the desired result of emulsion and permeate separation. For example, pore sizes from 1 nm to several microns may be suitable, providing that the pore size is sufficiently small to prevent or substantially prevent passage therethrough of the oil-in-alcohol emulsion particles.

Turing now to the figures, FIG. 1 illustrates a schematic diagram of a representative apparatus 10 according to the present invention, which incorporates a membrane as previously discussed. For the sake of this and other examples, the apparatus will be described with reference to canola oil as the oil and TG source, and methanol as the alcohol. The invention is not, however, limited in this regard. Due to the immiscibility of the sources of TG such as canola oil and alcohol such as methanol, and due to various surface forces, the canola oil will exist in the form of an emulsion; i.e. droplets suspended in methanol. On this basis, transesterification may occur at the surface of the canola oil droplets. In the presence of a permeable membrane 12 within module 13, the oil droplets are too large to pass through the pores of the membrane. In contrast, the FAME is substantially miscible in the methanol and will pass through the membrane pores optionally along with the methanol, glycerol and catalyst. Permeate comprising FAME can be collected on the permeate side of the membrane 12 and the equilibrium reaction can be driven towards FAME production.

The membrane 12 of the apparatus can be any suitable organic or inorganic material. Inorganic membranes are more suitable for use with organic solvents and, due their excellent thermal stability, they can be used at high reaction temperatures.

As illustrated in FIG. 1, a feed pump 16 is be used to feed a mixture of the reactants, including alcohol, the TG source and a catalyst to the system while a circulating pump 18 is used to circulate the mixture. The mixture may be derived, for example, from a feed tank comprising the mixture (not shown), the contents of which may be circulated or mixed to help create a homogeneous mixture. The circulating pump 18 may preferably further act to cause turbulence in the reaction mixture which helps in creating an emulsion comprising smaller droplets, thereby increasing the overall surface area of the oil/alcohol interface. The overall increase in surface area increases the reaction rate as transesterification occurs at the surface of the oil droplets.

A heat exchanger 14 is used to control the reaction temperature and comprises an inlet 30 and outlet 32 throughout which temperature controlled water or a heat transfer medium (for example) can be input and output.

A pressure differential may be established between the permeate side and the reaction mixture side of the membrane based on reaction feed rates as well as the desired rate of permeate collection, permeate purity, etc. sufficient to cause or enhance permeation of at least the FAME product in alcohol through the membrane 12 to the permeate side of the reactor 10. Other reaction components may be included in the permeate product such as the glycerol byproduct and catalyst since they may be small enough to permeate through the membrane. An optional back pressure controller 22 or the like may be used to control the relative pressure differential between the permeate side and the reaction mixture side of the membrane reactor 10. Permeate may be collected in a permeate collection tank 20 and may be further purified or separated using any suitable methods. It will be further appreciated that the pressure of the reaction mixture on the reaction mixture side may be increased by increasing or forcing input of reactants by pump 16.

FIG. 1 illustrates a particularly preferred feature of the invention involving recycling of reactants. The membrane 12 effectively acts as a cross flow filter and not a dead end filter. To take advantage of this, the membrane reactor 10 comprises a circulation loop through which the reactants are pumped and optionally heated with the heat exchanger 14. The circulation pump 18 ensures proper circulation. Depending on the reaction temperature the circulation pump 18 may be placed anywhere in the circulation loop of the membrane reactor 10 preferably such that the reactants are not in a vapour phase when passing through the circulation pump 18. A thermocouple 24 and/or additional analysis tools may be inserted into or allied to the apparatus 10 to monitor temperature, flow rates, viscosity, density, etc. in any of the streams.

The membrane reactor 10 further comprises an outlet 26 for purging the reactor 10.

Possible TG sources for use in the reactor 10 include, but are not limited to, virgin vegetable oils, vegetable oil, animal fats, non-edible oils, waste frying oils, etc.

As an alternative to premixing the catalyst with the reactants before charging of the membrane reactor 10, the catalyst may be added separately to the alcohol or in the case of a heterogeneous catalyst may be packed into the reactor, be coated or placed on the membrane or enter as a suspension.

A particularly preferred feature of the invention is illustrated in FIG. 1. It will be noted that the apparatus includes a continuous loop that allows a stream to flow through the module 13 and the heat exchanger 14. In this way, alcohol and/or catalyst exiting the module 13 may be recycled back (in this case via heat exchanger 14) to the input stream for the reaction mixture. In this way, the need to add further catalyst or alcohol to the reaction mixture is reduced, improving the continuous nature of the apparatus. Additional catalyst and/or alcohol may be charged into the apparatus during transesterification if needed, to help drive the equilibrium of the reaction toward FAME production.

The reaction previously shown in reaction scheme 1 is reversible. The apparatus of the present invention preferably includes features to help push the equilibrium towards the production of FAAE and glycerol. In order to increase the production of FAAE, products may be removed during the reaction in order to help drive the equilibrium to the product side. In selected embodiments, and depending upon reaction/ product stream conditions, glycerol may also be present in the permeate. Preferably, the glycerol in the emulsion and/or the permeate forms a third phase (separate to the alcohol or oil phases) so that it can be removed without difficulty for example using phase separation techniques. Preferably, this allows for FAME production which has a glycerol content several orders of magnitude lower than previous methods without the need for costly and time consuming separation steps.

An exemplary porous membrane reactor 10 can selectively permeate FAME, alcohol and glycerol from the reaction mixture side to the permeate side of the porous membrane. Various pore sizes ranging from nanoporous to microporous (e.g. 1 nm-5000 nm) may be selected such that oil droplets are substantially obstructed from passing through the pores in the membrane. Pore size may further be selected based on the desired reaction temperature, miscibility/immiscibility of the TG source, type of TG source, pressure differential between the retention side and the permeate side, etc.

The porous membrane 12 of the membrane reactor 10 can be comprised of any suitable composition that includes pores having a required size. Preferably the porous membrane is comprised of a material suitable to resist degradation or breakdown from alcohol and/or FAME. Examples of such porous membrane materials may include, but are not limited to: sintered carbon, aluminas, titanias, titanium oxide, stainless steel, ceramic, Teflon, graphite, and composites such as graphite with a titanium oxide layer.

Figure 2:
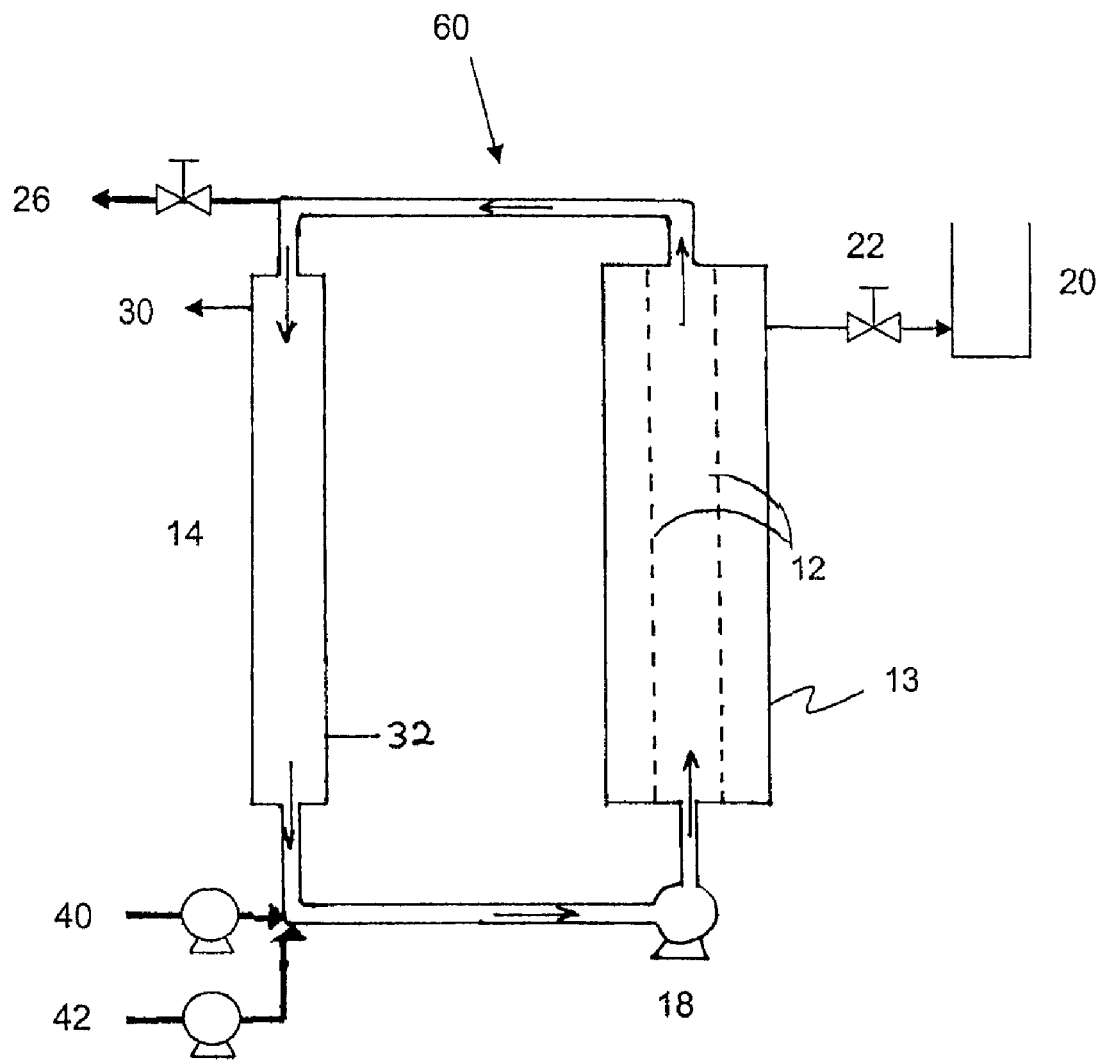
FIG. 2 is a schematic diagram of another exemplary apparatus of the invention.

FIG. 2 illustrates another exemplary apparatus of the invention shown generally at 60. The apparatus 60 is similar to that shown in FIG. 1 except in that separate feed pumps 40 and 42 are used to feed alcohol, (together with a suitable catalyst), and the TG source, respectively. This allows for pretreatment of either the TG source or the alcohol on an individual basis. For example, the TG source may comprise a substantially solid material at room temperature, and preheating of the TG source may improve its flowability for the continuous process. Additionally, the TG source may be filtered as desired.

Figure 3:
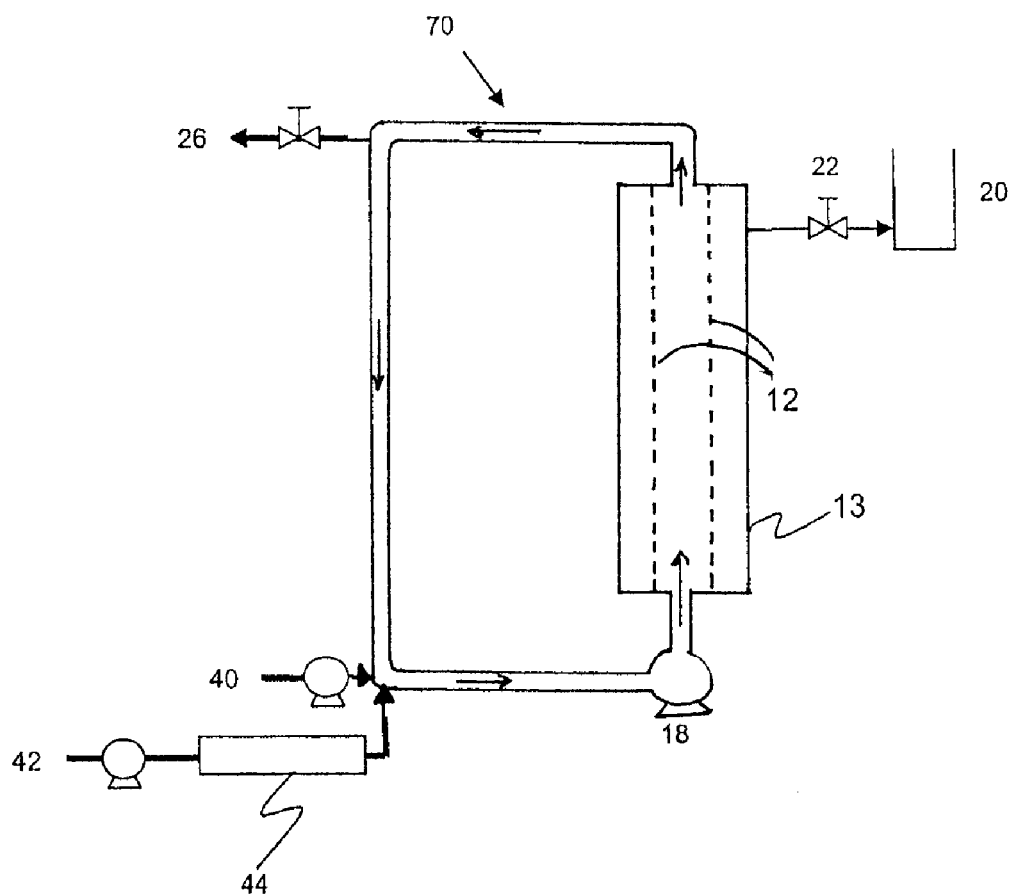
FIG. 3 is a schematic diagram of another exemplary apparatus of the invention.

FIG. 3 illustrates another exemplary apparatus of the invention shown generally at 70. The apparatus 70 includes a heater 44 in communication with the TG source feed pump 42 for preheating the TG source to a temperature sufficient to ensure or improve flowability of the oil. Additionally, the heat exchanger is not required in this embodiment, since heating of the TG source is carried out by the heater 44. This allows for flowability of the oil without a need to heat the alcohol to a point closer to the boiling point of the alcohol. This helps to reduce the amount of vapour in the reactor 70. Furthermore, by using the heater 44 to heat the oil as it is fed into the continuous loop of the apparatus, the heat exchanger may be optionally omitted. The circulation loop may involve a corrosive environment and removal of the heat exchanger from this environment may reduce the amount of maintenance for the apparatus, thereby lowering upkeep costs of the reactor 70.

Figure 4:
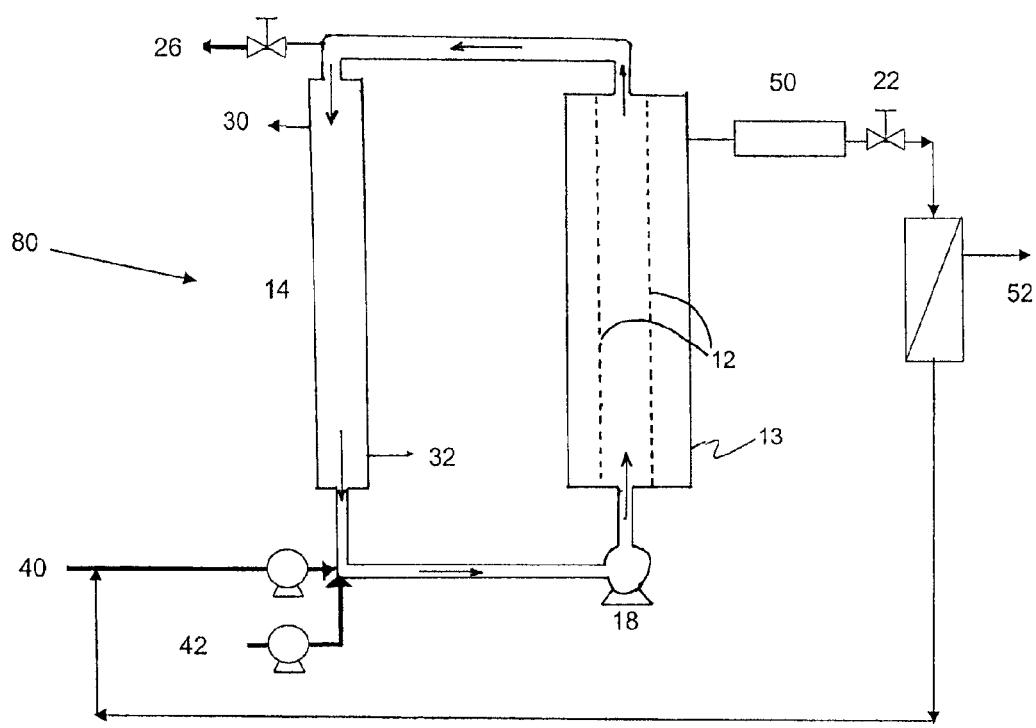
FIG. 4 is a schematic diagram of another exemplary apparatus of the invention.

FIG. 4 illustrates another exemplary apparatus of the invention shown generally at 80. The apparatus 80 comprises an alcohol feed 40 which can also be used to feed catalyst if required, and an oil feed 42. Also included is a heat exchanger 14 with input 30 and output 32. As previously discussed, the heat exchanger 14 may be absent from the continuous loop if required, and optionally replaced with a heater to heat the input oil stream 42 as shown in FIG. 3.

In any event, the permeate side of the apparatus 80 is further adapted (compared to previous embodiments) to allow for recycling of the alcohol phase in the permeate derived from module 13. A cooler 50 may be used to lower the temperature of the permeate product, thereby to facilitate permeate phase separation 52 of the permeate for example into a FAME/alcohol phase, and an alcohol/catalyst phase. The alcohol/catalyst phase may then be then be recycled, for example back to the alcohol input stream 40 (as shown) or to the reaction mixture in the continuous loop (not shown) prior to the module 13. Any residual alcohol in the FAME/alcohol phase may be evaporated and recovered, as required. As previously discussed, glycerol may also be present in the permeate, and phase separation techniques may further allow for glycerol recovery. Indeed, the inventors have successfully recovered glycerol from permeate that exhibits a high level of purity, circumventing the need for further washing and/or separation steps.

Figure 5:
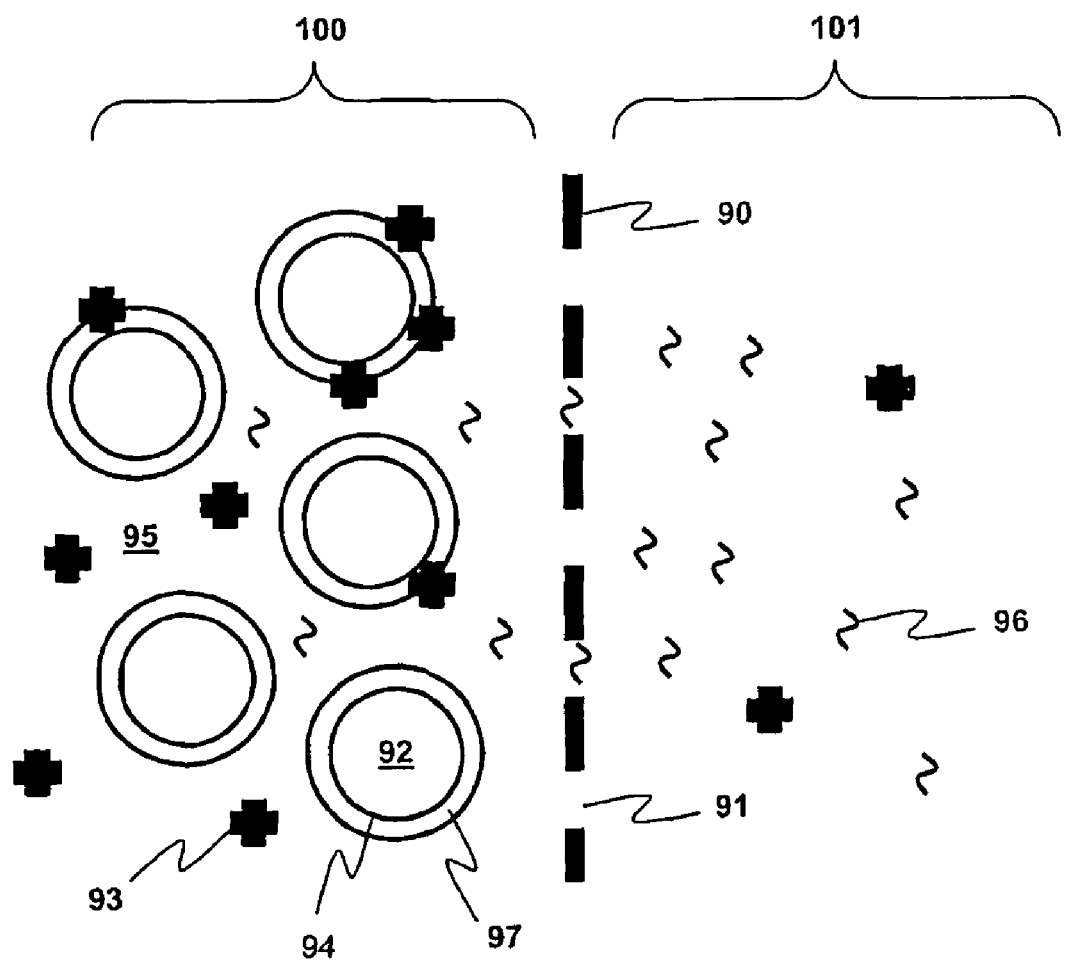
FIG. 5 is a schematic diagram illustrating the separation of oil and FAME by a porous membrane.

FIG. 5 schematically illustrates the separation of oil and FAME by a separative membrane. Pore size of the membrane illustrated in FIG. 5 is about 0.05 µm. The porous membrane 90 is shown to include pores 91 of about 0.05 µm in size. The porous membrane separates a reaction mixture side 100 and a permeate side 101. The oil effectively forms an emulsion of oil droplets 92 in alcohol 95, wherein the oil droplets are too large to pass through pores 91. Also present on the reaction mixture side of the porous membrane are catalyst molecules 93. At the surface 94 of the oil droplets an interface 97 is present between the oil and the alcohol at which the TG in the oil can be reacted by transesterification, induced by the catalyst, to ultimately form FAAE 96 such as FAME. The FAAE, being substantially miscible in the alcohol may pass through pores 91 of the porous membrane 90 to the permeate side 101, possibly accompanied by glycerol and/or catalyst. The passage of FAAE through the membrane may be assisted, for example by a pressure differential across the membrane. Moreover the reaction mixture may be at an increased temperature relative to ambient temperature, thereby to facilitate the reaction process and enhance the solubility of FAAE in the alcohol.

In particularly preferred embodiments of the invention, canola oil may be used as a source of TG and methanol as the alcohol, thereby to generate FAME. Separation of FAME from the other components of the permeate may optionally be carried out efficiently using suitable separation means such as washing. Using a membrane of a suitable pore size allows for the permeate to consist of FAME, catalyst, alcohol and glycerol with virtually no TG or oil present in the permeate. The temperature of the permeate may be adjusted such that two phases, (a methanol/FAME phase and a glycerol phase) may also be formed facilitating separation. This also allows for recycling of the catalyst and methanol through the membrane reactor.

Process Using High FFA Feedstock/Low Cost Feedstock

In order to help reduce production costs and make "biodiesel" competitive with petroleum diesel, low cost feedstock, such as non-edible oils, waste frying oils and animal fats may be used as raw materials. However, the higher amounts of free fatty acids (FFA) and water in such feedstocks (relative for example to canola oil) can result in the production of soaps for example in the presence of an alkali catalyst. Thus, traditionally, additional steps to remove any water and either FFA or soap from the reaction mixture may be required. Typical commercial approaches involve pre-reacting (i.e. esterifying) the FFA with an acid catalyst followed by neutralization and addition of base to perform the transesterification of the oil.

Under typical reaction conditions, using low cost feedstock with a higher free fatty acid content produces soaps by neutralizing the free fatty acid in the oil, which results in triglyceride saponification. The soap formations are undesirable side-reactions as they may partially consume the catalyst, decreasing the biodiesel yield and complicating the separation and purification steps of the permeate.

However, when the apparatus of the present invention is used for esterification of such TG sources, saponification is less of an issue.

Particulates, which can act as a nucleating site for micelle (soap aggregates) formation may be filtered by the porous membrane. As a result, the formation of soap aggregates in the permeate may be substantially reduced. The possibility remains that there may be actual soap in the permeate but the formation of the aggregates is minimized. Although aggregate formation may occur in the reaction mixture, such aggregates preferably may not pass through the porous membrane so that the separation of the FAME-rich phase from the methanol-glycerol phase and the subsequent water washing of the FAME is relatively simple. As far as pore size limitations are concerned, at least nano- and ultra-filtration have been successfully employed and thus, pore sizes below 0.5 micron may be effective for filtering out particulates. Between 0.45 and 5 microns there may be some benefits in filtering although very fine colloidal matter and very small particulates may pass through the membrane.

As noted above, when using high FFA feedstock (e.g. used frying oil or yellow grease), the permeate may separate easily compared to the reaction mixture, which may contain fine particulates (less than 5 microns) and colloids from soaps and glycerol. These may act as nucleating sites for soaps which promote the formation of stable emulsions and inhibit dephasing. This is a known problem in conventional batch reactors since the FAME may not be easily separated from the reaction mixture. In the case of a preferred apparatus of the invention that involves a continuous process, the sub-micron particles be retained in the reaction mixture loop, and therefore may not act as nucleating sites in the permeate stream. As such, the glycerol-rich and FAME-rich phases in the permeate stream may more easily be separated. It follows that in selected embodiments the oil feedstock may require minimal pre-treatment. If required, the oil feedstock may optionally be subjected to very coarse filtering and water removal, if required.

In apparatuses and methods employing acid catalysts, pre-treatment of the oil feedstock to remove FFA may be unnecessary since the acid catalyst may esterify (as opposed to transesterify) FFA to FAME, and the remaining TG may be transesterified. Exemplary acid catalysts are sulphuric acid, hydrochloric acid and sulfonic acid. In the case of the alkali catalyzed processes, no pre-treatment to remove FFA may be required if the formation of soap in the reaction mixture can be tolerated. Exemplary alkali catalysts include, but are not limited to, sodium hydroxide, sodium methoxide and potassium hydroxide.

Process Using Higher Cost Feedstocks

Virgin vegetable oils including but not limited to soybean oil, sunflower oil, rapeseed oil and canola oil may be used as a source of TG in preparing FAAE. Such oils may have a lower content of free fatty acids thereby helping to avoid aggregate and soap formation. Both alkali-catalysts and acid-catalysts may be used to drive the reaction. Basic catalysts may be more cost effective as the process is faster and the reaction conditions less corrosive.

Temperature

Figure 7:
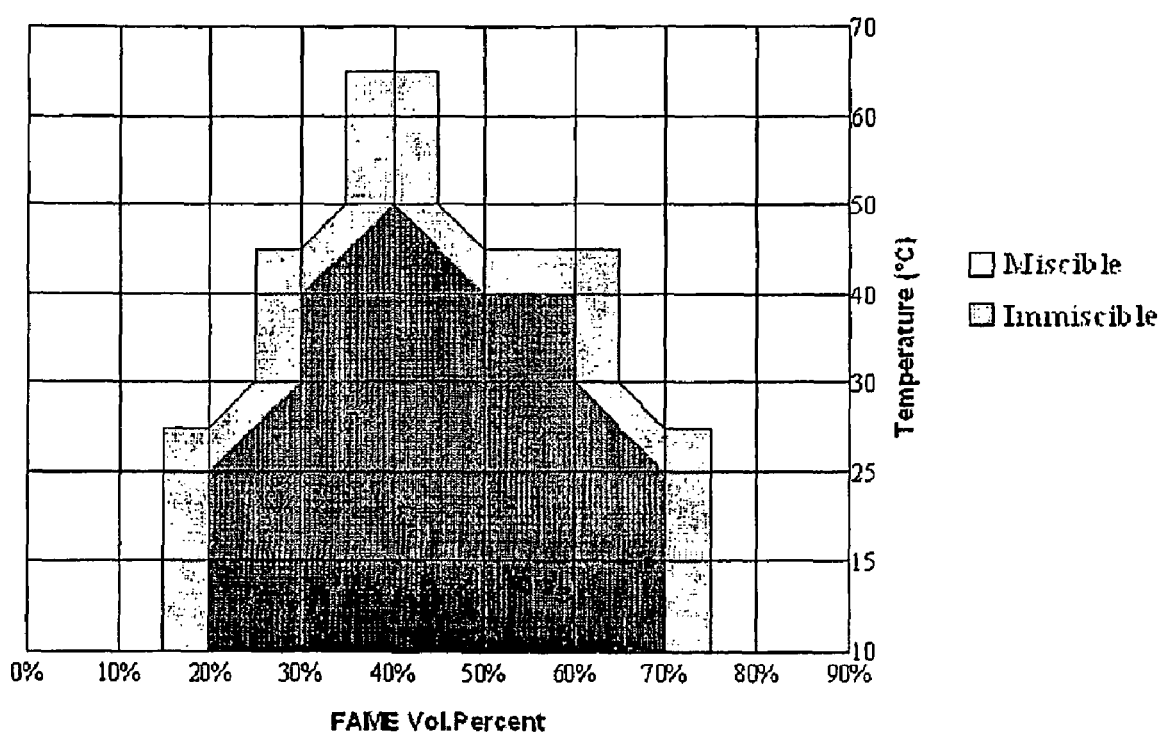
FIG. 7 is a graph plotting the temperature vs. volume percent FAME or biodiesel (produced from a batch process and contains >95% fatty acid methyl ester, or 95%+fatty acid methyl ester).

The inventors have determined that a wide variety of reaction temperatures may be suitable to produce FAAE from TG. As previously discussed, the TG source should be flowable throughout the membrane reactor and should be substantially immiscible in the alcohol of the reaction mixture. The minimum suitable temperatures will vary depending on the TG source. TG sources which have a higher FFA content often require slightly elevated temperatures relative to oil feedstocks with a lower FFA content. At room temperature, flowability of low FFA feedstock is observed. Substantial miscibility of FAAE in alcohol is also important to the operation of the apparatus of the invention and presence of FAME in the permeate. FAME is substantially miscible in alcohol at a variety of concentrations and at a variety of temperatures as illustrated in FIG. 7 which shows miscibility of FAME phase obtained from a batch reaction in methanol. At an exemplary reaction temperature of between about 60° C. and about 70° C., the reaction proceeds with high yields with a high purity of FAME in the permeate.

Pressure Differential

Pressure differential between the permeate side and the retention side of the membrane reactor is preferred for passage of transesterification products through the porous membrane to form the permeate. A minimal pressure differential of about 7 kilopascals is preferred for efficient operation of the apparatus of the invention. A higher permeation rate tends to increase reaction rate and further helps to drive the equilibrium of the transesterification reaction toward FAME production. Increased pressure within the apparatus of the invention may further allow for higher reaction temperatures without vaporizing the components of the reaction mixture. Various pressure differentials across the porous membrane may be used depending on the thickness and strength of the porous membrane. Thicker walled modules may have a pressure as high as 7000 kilopascals. The pressure of the system can be as high as about 70 000 kilopascals for specific applications comprising a membrane housing of a suitable strength as the operating pressure in the reactor loop is decoupled from the trans-membrane pressure limitations of the membrane.

EXAMPLES

The following examples are presented for illustrative purposes only, and are in no way intended to limit the meaning or scope of the invention as described and claimed herein.

Example 1

Analysis of Immiscibility/Miscibility

Materials

Methanol (95% Tech. Grade) was supplied by (Commercial Alcohols Inc., Brampton, ON) and the canola oil by (No Name®, Toronto, ON, and purchased at the local foodstore). FAME or biodiesel was produced from a batch process and contains >95% fatty acid methyl ester (Zheng, 2003). Sulfuric acid (95%-98%, Reagent Grade) and tetrahydrofuran (99.95%, Chromatography Grade) were supplied by (EMD Chemicals Inc., Gibbstown, N.J., U.S.A.).

Experimental Design

Relative miscibility of canola oil in methanol and that of FAME in methanol at several temperatures and compositions was determined. Nine volume ratios of canola oil to methanol and FAME to methanol were investigated: 10, 20, 30, 40, 50, 60, 70, 80 and 90% at temperatures of 25, 30, 40, 50, 60 and 70° C. Mixtures were prepared in 30 mL glass vials, shaken and placed in a temperature-controlled water bath. The relative volume of each phase was calculated by measuring the height of the meniscus separating the two phases.

After the measurements for miscibility, a membrane reactor was constructed. A carbon membrane (Koch Membrane Systems, Inc., Wilmington, Del., U.S.A.) was used in the reactor. The pore size of the membrane was 0.05 µm. The inside and outside diameter of the membrane were 6 mm and 8 mm. The length of carbon membrane tube was 1200 mm. The whole area of the membrane was 0.022 m². A schematic diagram of the membrane reactor system is showed in FIG. 1, as previously described. A controller volume pump (Milton Roy Company, Ivyland, Pa., U.S.A.) was used to feed methanol to the system while seal-less centrifugal canned motor pumps (Labcor Inc. Concord, ON) were used to circulate the mixture. A heat exchanger (Neslab Instruments, Inc., Portsmouth, N.H., U.S.A.) was used to control the reaction temperature.

Experiments were carried out at 60° C., 65° C. and 70° C. in a 300 mL membrane separative reactor for 6 h. 0.5, 2, 4 and 6 wt % concentrations of sulfuric acid catalyst were investigated. 100 g of canola oil was used in each run. Pressure was controlled at 138 kPa between the permeation side and reaction side of the membrane. A schematic of the separation of oil and FAME by a separative membrane is shown in FIG. 5. All experiments and sample analyses were carried out in random order to minimize any potential experimental errors.

Methanol and acid catalyst were pre-mixed and charged into the reactor system prior to each reaction. Canola oil was charged into the membrane reactor, the membrane reactor was sealed, the circulation pump was started. The reaction temperature was monitored using a thermocouple placed in the circulation loop. After circulating the reactor contents for 10 minutes, methanol and acid catalyst were continuously charged into the membrane reactor during the transesterification and the heat exchanger was switched on. The permeate product was taken from each experiment. The permeate product was mixed with the same volume of water and the resulting mixture was allowed to settle for 24 h. The upper layer of the mixture was retained, then washed with 1 L reverse osmosis water. The mixture was again allowed to settle for 24 h, after which the sample was placed in a 30 mL vial until analysis. High performance liquid chromatography (HPLC) analysis showed the purification method to be effective and no residual acid was found in the sample. The oil left in the membrane reactor was then placed in a container and analyzed.

Experimental Miscibility of Oil/Methanol Mixtures

The volumetric ratio of canola oil to methanol was calculated according to:

$$\text{Volumetric ratio of canola to mixture} = \frac{\text{Height of oil phase in vial}}{\text{Total height of mixture in vial}} \quad (2)$$

Figure 6:
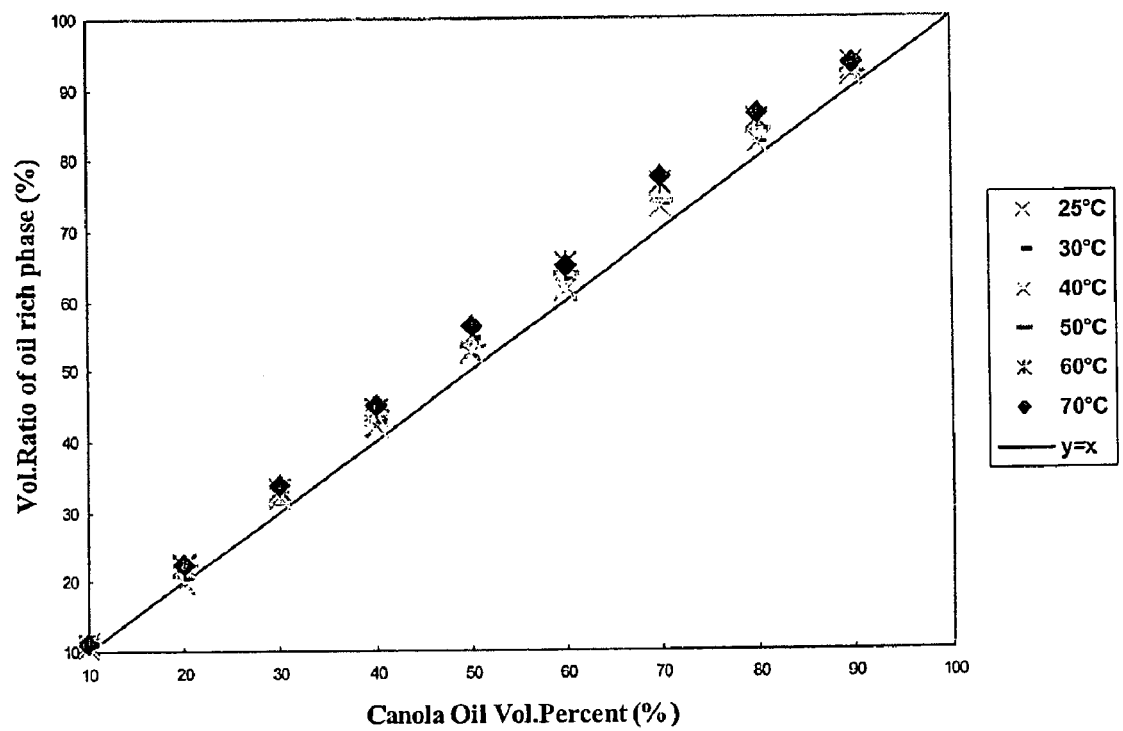
FIG. 6 is a graph plotting the volume ratio of lower phase (canola oil) to entire mixture vs. volume percent canola oil in mixture.

The volume ratio of the lower phase (i.e. the canola oil phase) was plotted against the actual content of canola oil in the graph illustrated in FIG. 6. It is clear from the figure, that temperature had only a slight effect on the miscibility of the canola oil and methanol. From all indications, it appears that methanol is slightly miscible in canola oil. For all practical purposes, however, one could say that the two phases are immiscible.

Experimental Miscibility of FAME/Methanol Mixtures

The temperatures were plotted against the actual content of FAME in the graph illustrated in FIG. 7. In this case, temperature had a more significant effect on the miscibility of FAME and methanol. It appears that FAME is conditionally miscible in methanol. The inventors observed that FAME and methanol were immiscible between 20% and 70% over a broad range of temperatures. In practice, transesterification reactions are preferably carried out above 60° C. Furthermore, miscibility was observed at room temperature and below for various concentrations of FAME. Both FAME and methanol are miscible at this temperature. The microporous membrane used in the reactor can separate the oil droplets from the methanol solution containing FAME, glycerol and the catalyst. As reactants are removed from the reactor, the equilibrium of the reaction will lie towards the production of FAME and glycerol giving higher conversions.

Transesterification occurs at the surface of canola oil droplets suspended in methanol. After the reaction, the FAME can form a layer near the canola oil droplet surface (see FIG. 5). As shown in FIG. 7, the canola oil and methanol are immiscible at the reaction temperature. On the other hand, at the reaction temperatures, one may expect that the FAME would be soluble in the methanol. The concentration of FAME in the methanol may be controlled by the addition of methanol to the reactor.

Figure 8:
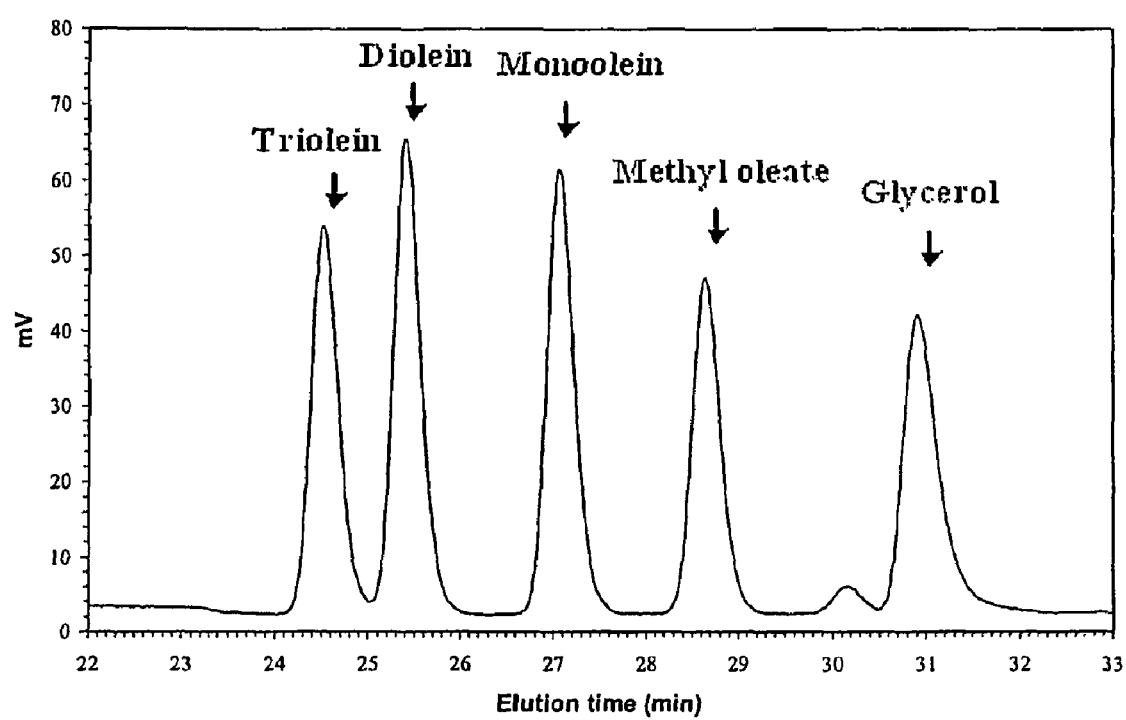
FIG. 8 is an HPLC chromatogram of a mixture of standards.

A microporous carbon membrane reactor can selectively permeate FAME, methanol and glycerol during the transesterification from the reaction zone. The molecule of canola oil is trapped in droplets forming an emulsion. The droplets cannot pass through the pores of the membrane because they are larger than the pore size of the carbon membrane. Results showed that during the reaction, canola oil did not appear in the permeate side. HPLC was used for the determination of compounds in both the permeate and retentate. A Waters Corp. HPLC system was used to analyze the content of permeate and retentate streams, using two 300×7.5 mm Phenogel columns of 3 µm particles with a 100 Å pore size. A calibration curve was first generated from 5 standards, as shown in FIG. 8.

Figure 9:
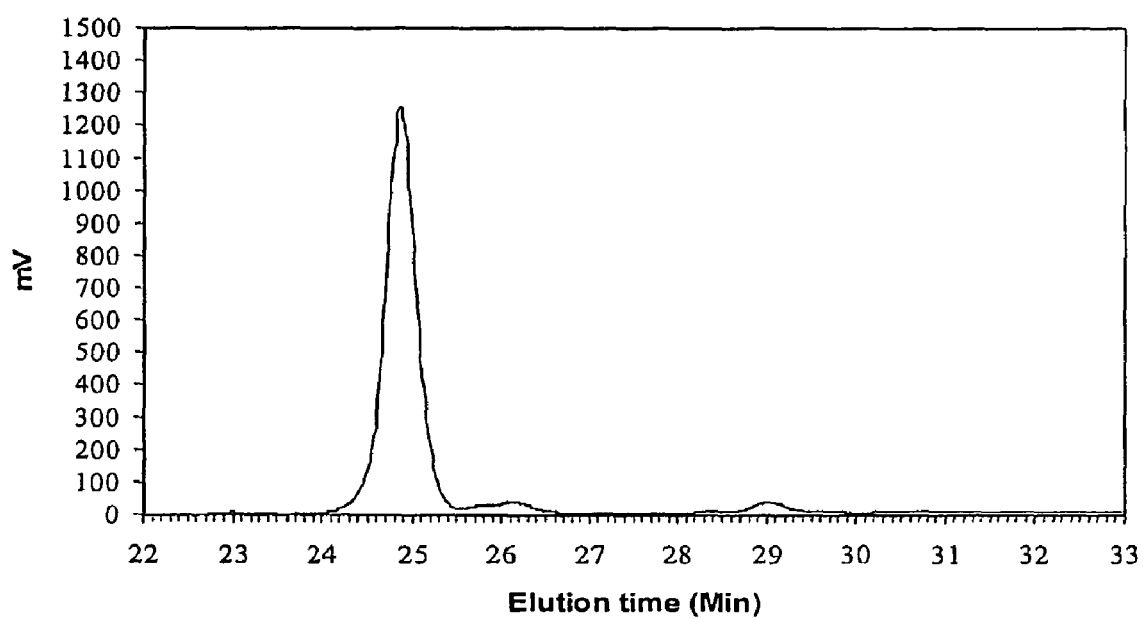
FIG. 9 is an HPLC chromatogram of a sample reaction mixture.

A typical HPLC chromatogram of the retentate is illustrated in FIG. 9. It is observed from the figure that the retentate is composed almost completely of TG (i.e., canola oil). The conversion of TG to FAME was directly calculated by:

$$X = \frac{M_{oil(t=0)} - M_{oil(t=t)}}{M_{oil(t=0)}} \quad (3)$$

where X is the fractional mass conversion, $M_{oil(t=0)}$ is the initial mass of oil (or TG equivalents) in the reactor. $M_{oil(t=t)}$ is the mass of TG left in the reactor after 6 h of reaction. A conversion of 99% was obtained after 6 h of operation.

Figure 10:
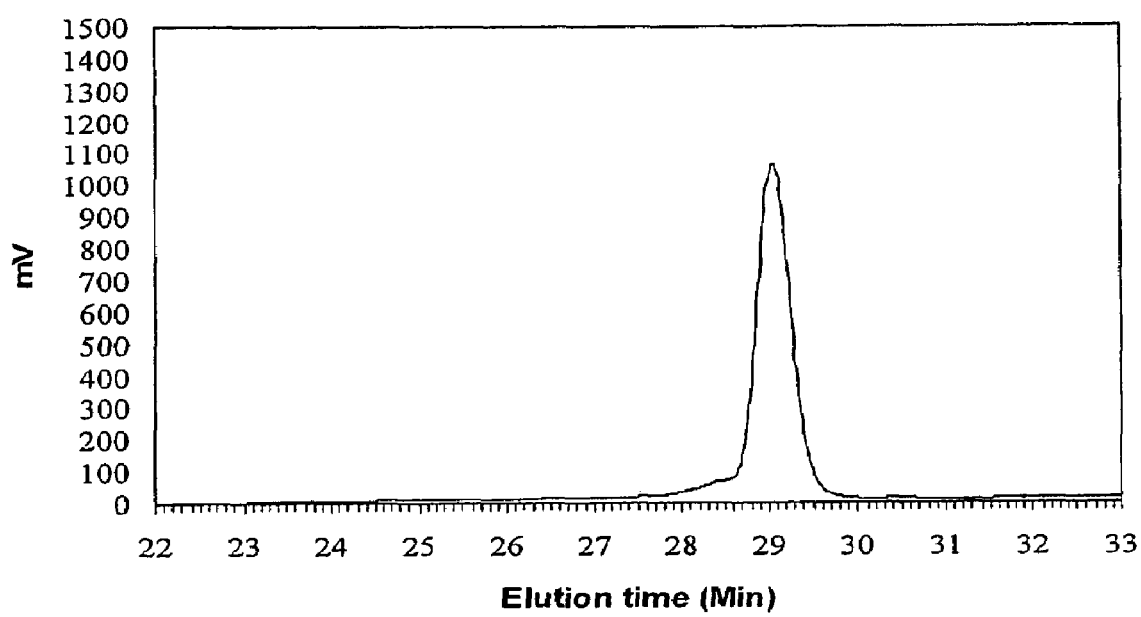
FIG. 10 is an HPLC chromatogram of a sample permeate.

FIG. 10 shows a typical chromatogram of the permeate. It is observed that very high purity FAME was produced by the exemplary method.

Experimental Immiscibility/Miscibility Conclusions

It was shown that canola oil and methanol are only slightly miscible in the temperature range 25-70° C. The methanol was slightly dissolved in the canola oil from 1.1 vol. % to a maximum of 7.4 vol. % at 70° C. At low concentrations (<30 vol. %) FAME was almost completely miscible in methanol at 70° C. These miscibility characteristics indicate that the use of a two-phase membrane reactor for the production of biodiesel (FAME) from canola oil is feasible.

Example 2

Apparatus and Reaction Experimental Optimization

Materials

Methanol (99.85% Reag. Grade containing <0.1% water) was supplied by (Commercial Alcohols Inc., Brampton, ON, Canada) and the canola oil by (No Name®, Toronto, ON, Canada, purchased at a local foodstore). FAME or biodiesel produced from a batch process and contains >95% fatty acid methyl ester. It was produced from the acid-catalyzed transesterification of waste oils from a previous study (Zheng, 2003). Sulfuric acid (95%-98%, Reagent Grade) and tetrahydrofuran (99.95%, Chromatography Grade) were supplied by (EMD Chemicals Inc., Gibbstown, N.J., U.S.A.).

Exemplary Apparatus Design and Experimental Design

A 300 mL membrane reactor system was constructed and is shown schematically in FIG. 1. A carbon membrane (Koch Membrane Systems, Inc., Wilmington, Del., U.S.A.) was used in the reactor. The pore size of the membrane was 0.05 mm. The inside and outside diameters of the membrane were 6 mm and 8 mm, respectively. The length of carbon membrane tube was 1200 mm giving a surface area of 0.022 m² for the entire membrane. A controlled volume pump (Milton Roy Company, Ivyland, Pa., U.S.A.) was used to feed the oil and methanol/catalyst mixtures to the system while a seal-less centrifugal canned motor pump (Labcor Inc. Concord, ON) was used to circulate the mixture at a flow rate of 15.2 mL/min. A heat exchanger (Neslab Instruments, Inc., Portsmouth, N.H., U.S.A.) coupled with LabView™ software was used to control the reaction temperature.

Experiments were carried out at 60, 65 and 70° C. in a 300 mL membrane reactor for 6 h. 0.5, 2, 4 and 6 wt % concentrations of sulfuric acid catalyst were investigated (see Table 1). 100 g of canola oil were used in each run. Pressure was controlled at 138 kPa between the permeation side and reaction side of the membrane. All experiments and sample analyses were carried out in random order to minimize any potential experimental errors. Several replicate runs also were performed (see Table 1). Additional experiments were conducted to verify the effect of methanol feed flow rate and the use of a base catalyst.

TABLE 1

Experimental conditions

| Temperature (° C.) | Catalyst concentration (wt. %) | # of replicates |
|---|---|---|
| 60 | 0.5 | 2 |
| 65 | 0.5 | 2 |
| 70 | 0.5 | 2 |
| 60 | 2 | 3 |
| 65 | 2 | 3 |
| 70 | 2 | 2 |
| 60 | 4 | 2 |
| 65 | 4 | 2 |
| 70 | 4 | 2 |
| 60 | 6 | 4 |
| 65 | 6 | 4 |
| 70 | 6 | 4 |

Exemplary Membrane Reactor Experiments Procedure

The methanol and sulfuric acid were pre-mixed and charged into the membrane reaction system prior to each reaction. 100 g of canola oil was charged into the membrane reactor, the membrane reactor was sealed and the circulation pump was started. After a 10 min circulation time, methanol and acid catalyst were charged continuously into the membrane reactor with the feed pump at a flowrate of 6.1 mL/min. The heat exchanger was switched on to achieve the reaction temperature (60, 65 and 70° C.). A thermocouple was used to monitor the reaction temperature. A stable reaction temperature (+/−0.1° C.) was achieved within 30 min for 60° C., 40 min for 65° C. and 45 min for 70° C. of starting the heat exchanger. Pressure was controlled at 138 kPa. The permeate product was collected in a 2000 mL flask. All experiments were conducted for 6 h.

Additional experiments were conducted to observe the effect of methanol/acid catalyst feed flowrate on the conversion for both acid- and base-catalyzed transesterifications. These flowrates were 2.5 mL/min, 3.2 mL/min and 6.1 mL/min. The permeate product collected during the entire experiment time was mixed with an equivalent volume of reverse osmosis water (produced from tap water) and shaken by hand for about 5 min. This step served to stop any further reaction in the samples by promoting a phase separation of the glycerol phase containing most of the catalyst from the FAME phase. The mixture was allowed to settle for 24 h and filtered using a 0.5 μm membrane filter (Nalge Company, New York, N.Y., U.S.A.). The upper layer of the resulting two-phase mixture was transferred to a separatory funnel and washed with 1 L of reverse osmosis water. The resulting mixture was allowed to settle for 24 h, after which the upper layer was analyzed using high performance liquid chromatography (HPLC) according to the method used by Dubé et al. (2004). Any unreacted oil in the retentate stream was also analyzed by HPLC. The retentate solution was neutralized by sodium hydroxide solution before analysis by HPLC. The HPLC analysis revealed that the purification method was effective and no residual acid was found in the samples.

High Performance Liquid Chromatography (HPLC) Analysis

A Waters Corp. HPLC system consisting of an HPLC pump, a controller, a differential refractometer and autosampler was used to analyze the contents of the permeate and retentate streams. Waters Millennium 32™ software (Waters) was utilized for analysis. The columns used were two 300× 7.5 mm Phenogel columns of 3 μm particles and 100 Å pore size (Phenomenex, Torrance, Calif., U.S.A.) connected in series. The mobile phase was tetrahydrofuran (THF) at a flow rate of 0.5 mL/min at 23° C.

THF was used to make a 20 mg/g solution of the sample. Two grams of the solution was injected into the autosampler vials. Prior to analysis, the solutions were filtered through a 0.5 μm polytetrafluoroethylene (PTFE) syringe filter.

The HPLC analysis was conducted according to the method shown by Dubé et al. (2004) and Darnoko et al. (2000). A calibration curve was generated from 5 standards: triolein (TG), diolein (DG), monoolein (MG), methyl oleate (FAME), glycerol. The injection masses were plotted against the peak area. Each standard was injected 3 times at 5 different concentrations. The calibration curves of the standard solutions showed good linearity. The retention times of the standards are shown in Table 2. FIG. 8 shows a typical chromatogram of a mixture of standards (note: sample concentrations were 0.548 mg/mL TG, 0.654 mg/mL DG, 0.602 mg/mL MG, 0.642 mg/mL FAME and 0.584 mg/mL glycerol (injection volume was 2 μL).

TABLE 2

Retention time of standards

| Standard | Retention time (min) | Relative retention time |
|---|---|---|
| Triolein (TG) | 24.57 | 1 |
| Diolein (DG) | 25.45 | 1.04 |
| Monoolein (MG) | 27.12 | 1.10 |
| Methyl oleate (FAME) | 28.68 | 1.17 |
| Glycerol | 30.95 | 1.26 |

The fractional conversion of oil to FAME, based on the amount of oil remaining in the reactor, was taken to represent the actual conversion. The oil to FAME conversion at time t was calculated from $$X = \frac{M_{oil(t=0)} - M_{oil(t=t)}}{M_{oil(t=0)}} \quad (3)$$

where X was the fractional conversion, $M_{oil(t=0)}$ was the original of mass of oil (or TG equivalents in order to account for the presence of any DG or MG) in the reactor. $M_{oil(t=t)}$ was the mass of TG left in the reactor after the 6 h reaction time.

It has therefore been determined that a microporous membrane reactor can selectively permeate FAME, methanol and glycerol during the transesterification from the reaction zone. The molecule of canola oil is trapped in droplets forming an emulsion. The droplets cannot pass through the pores of the membrane because they are larger than the pore size of the carbon membrane. Results showed that during the reaction, canola oil did not appear in the permeate side. HPLC was used for the determination of compounds in both the permeate and retentate. A typical HPLC chromatogram of the retentate is illustrated in FIG. 9. It may be seen that the main component in the retentate is TG (retention time=25 min) or canola oil. Trace amounts of DG (retention time=26 min) and FAME (retention time=~29 min) also are evident.

FIG. 10 illustrates a typical chromatogram of the permeate. The complete absence of a peak at 25 min indicates that very high purity FAME was produced by the membrane reactor.

At the reaction conditions in this study, as mentioned previously, methanol is only slightly miscible in canola oil. At the same time, FAME and methanol are miscible. These physical characteristics are what permit the membrane reactor to separate the FAME from the oil.

Experimental Effect of Temperature

Figure 11:
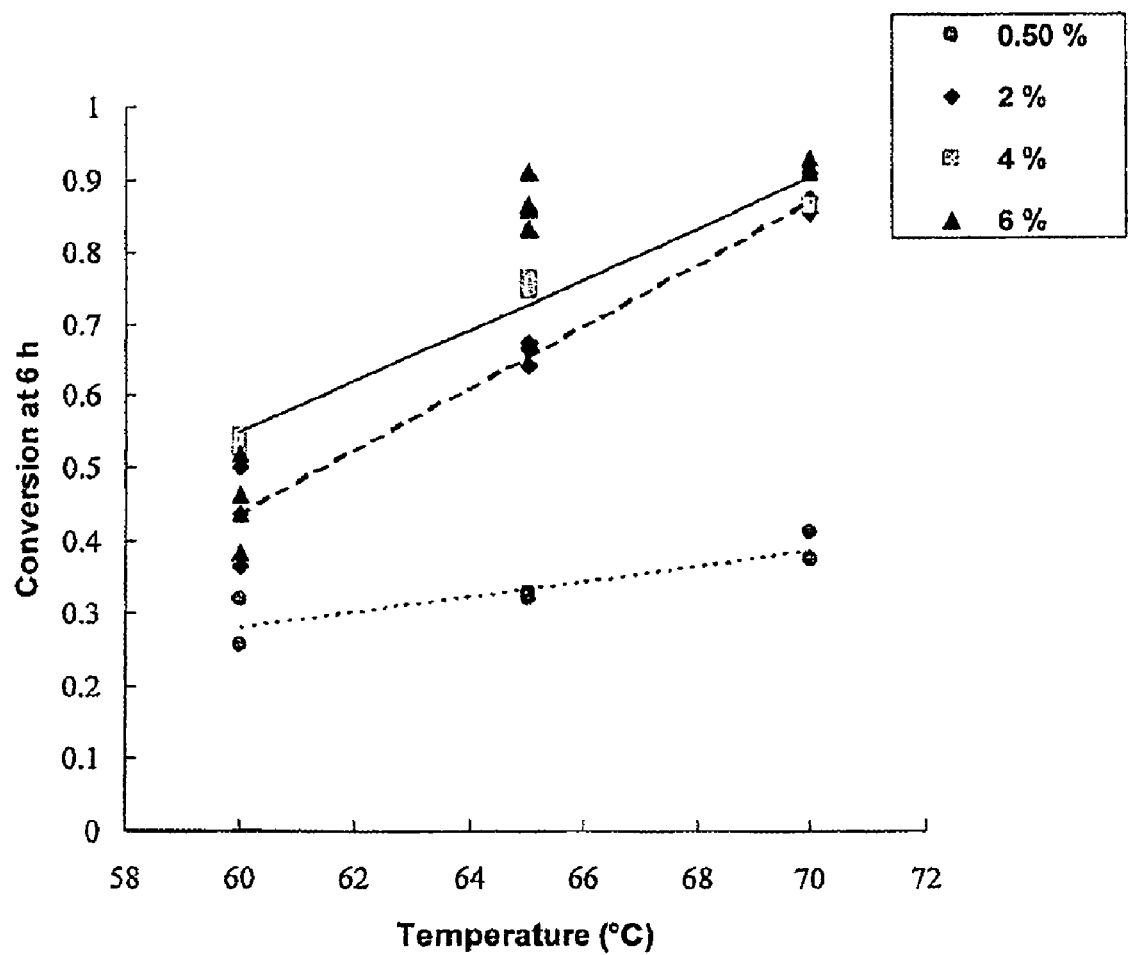
FIG. 11 is a graph plotting the effect of reaction temperature and acid-catalyst concentration (linear fit for 0.05, 2 and 4 wt. %, fit not plotted for 6 wt. %.

Liu (1994) noted that heating was required for faster reaction and the reaction time may vary from a few minutes to several hours for a temperature range of 60-90° C. for acid-catalyzed transesterification. From the experiments, three different reaction temperatures, 60, 65 and 70° C., were selected. FIG. 11 illustrates the conversion versus temperature data as a function of acid concentration. At each acid concentration, an increase in final conversion was evident as temperature was increased.

Experimental Effect of Catalyst Concentration

The catalyst concentration was found to affect the conversion of canola oil to FAME. It is evident from FIG. 11 that an increase in acid concentration served to increase the conversion of TG to FAME. Based on the information provided in FIG. 11, it can be seen that between 0.5 and 2 wt. % acid concentration the conversion increased substantially at higher temperatures, but the conversions of 2, 4 and 6 wt. % were not very different (<10% conversion). Thus, concentrations of acid beyond 2 wt. % are less necessary at 70° C. In addition, the reaction was more sensitive to temperature at high acid concentration.

Experimental Effect of Flow Rate

The methanol/acid catalyst feed flow rate was set to 2.5, 3.2 and 6.1 mL/min for three separate experiments at 2 wt. % acid concentrations (see Table 3). A significant increase in conversion was observed as the flow rate was increased.

TABLE 3

Effect of flow rate on conversion

| Expt. | Flow rate (mL/min) | Temperature (° C.) | Conversion via acid-catalyst (%) | Conversion via base-catalyst (%) |
|---|---|---|---|---|
| 1 | 2.5 | 65 | 35 | 95 |
| 2 | 3.2 | 65 | 48 | 96 |
| 3 | 6.1 | 65 | 64 | 96 |

Experimental Effect of Base Catalyst

The use of a 1 wt. % NaOH catalyst concentration was tested at different flow rates (see Table 3). Comparison to the acid-catalyzed case shows that the base catalyst provided a much higher conversion, than that of acid catalyst. Freedman et al. (1984) studied the effect of the type of catalyst on the reaction. It was found that 98% conversion was observed at 1 wt. % sodium hydroxide. They also found that greater than 90% of the oil was converted to methyl esters at 1 wt. % sulphuric acid. In our base-catalyzed experiments, small amounts of soap were detected in the wash waters. These were not found in the acid-catalyzed runs. One possible reason was that the canola oil may have contained significant amounts of FFA that were converted to soaps rather than FAME by the base catalyst. This may have implications for the use of an acid catalyst which, despite the slower reaction rate, may provide both a technological and economic advantage for the use of lower cost waste feedstock, which contain higher levels of FFA (Zhang et al., 2003a, 2003b).

Membrane Material Resistance to Degradation

An important consideration when dealing with high acid or base catalyst concentration is the life of the carbon membrane used in the reactor. The carbon membrane was able to resist the high acid and base environments in the experiments. FAME also presents very strong solvent qualities. After ten months of operation and contact with methanol/acid or methanol/base solution, no tangible evidence of degradation of the membrane was observed.

Outline of Experimental Runs

Table 4 illustrates the effects of membrane function and pore size in a semi-continuous membrane reactor. A base catalyst was used in a concentration of 0.5%. The reaction temperature was 65° C. and reactor pressure was 138 kPa. As the TG source, virgin canola oil was used. All runs of the experiment indicated no oil in the permeate product regardless of pore size used in the membrane.

TABLE 4

Membrane function and pore size effects.

| Carbon Membrane pore size | 100 g oil Injectied initially | 150 g oil injected initially | 175 g oil injected initially |
|---|---|---|---|
| Old 0.05 μm | I-#1 | I-#2 | I-#3 |
| New 0.05 μm | I-#4 | I-#5 | I-#6 |
| New 0.2 μm | I-#7 | I-#8 | I-#9 |
| New 0.5 μm | I-#10 | I-#11 | I-#12 |
| New 1.4 μm | I-#13 | I-#14 | I-#15 |

Figure 13:
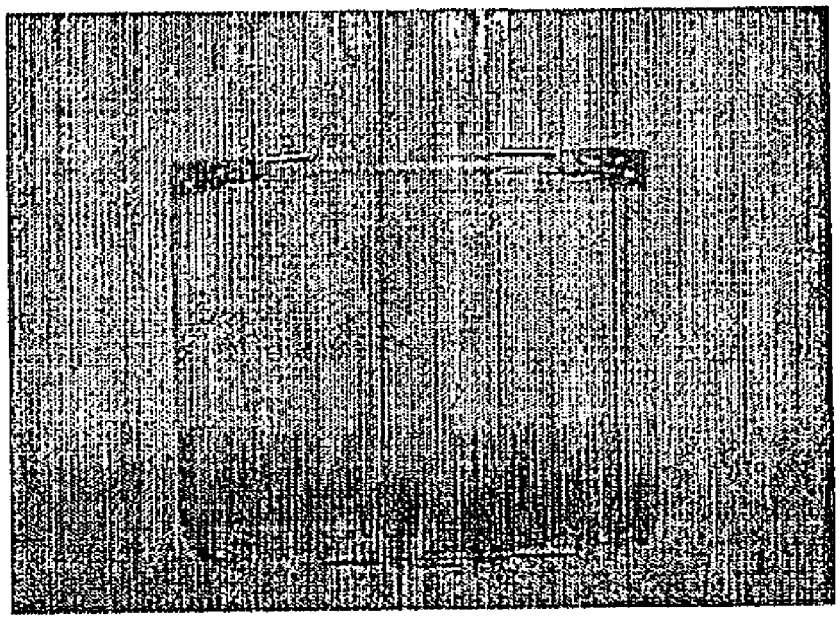
FIG. 13 photographically illustrates a permeate derived from an apparatus of the present invention when a) allowed to sit at room temperature for several hours, and b) when heated to 40° C. using tap water.
Figure 13:
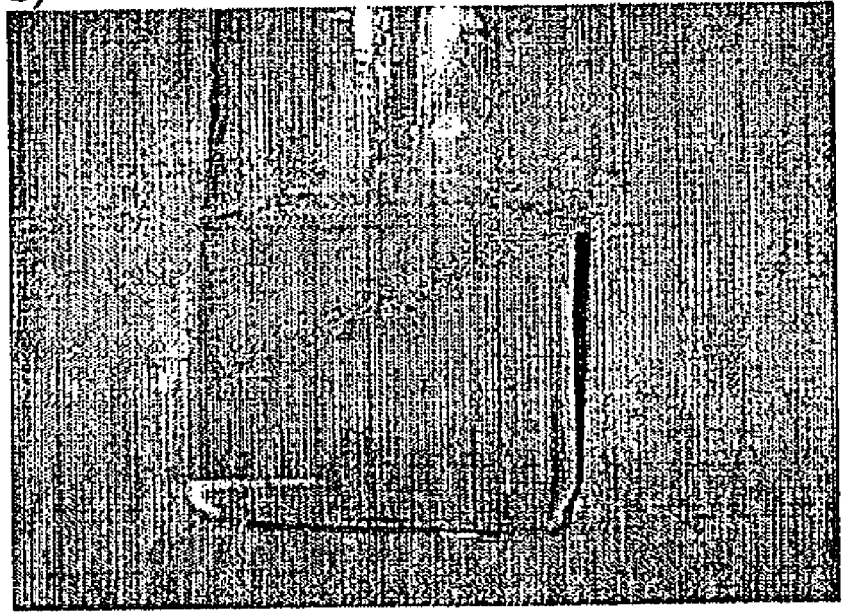

FIG. 13 provides photographs of a sample permeate from an apparatus of the present invention. In FIG. 13a, phase separation by allowing the permeate to settle at room temperature for several hours allows the permeate to separate into at least two distinct phases. In contrast, FIG. 13b shows the same permeate without separation into phases following heating in tap water at 40° C. Analysis of the phases shown in FIG. 13a is shown in Table 6.

TABLE 5

| Phase | Mass % FAME | Mass % Glycerol | Mass % Methanol |
|---|---|---|---|
| Upper | 21.4 | 6.2 | 72.4 |
| Lower | 82.2 | 0.0 | 16.7 |

The high level of methanol in the upper phase illustrates its suitability to be recycled for example to the reaction mixture stream in a continuous process. Further phase separation may allow for the separation of glycerol from the methanol.

Table 6 illustrates a summary of experiments performed in a membrane reactor with a 330 mL volume. Triglyceride and monoglyceride were not present in the permeate produced, while some diglyceride appeared. However, as catalyst and alcohol are also present in the permeate product, the diglyceride intermediate may continue to react prior to being cooled to room temperature to produce FAME. If the pore size is below 0.2 microns, further reaction of the permeate is not required.

TABLE 6

Seventeen Experimental runs.

| Run | Carbon Membrane pore size (μm) | Initial injection mass of oil (g) | Initial molar ratio | DG concentration in permeate (% mass) | MG in permeate | TG in permeate |
|---|---|---|---|---|---|---|
| 1 | Old 0.05 | 100 | 50.3 | / | / | / |
| 2 | Old 0.05 | 150 | 26.2 | / | / | / |
| 3 | Old 0.05 | 175 | 19.4 | / | / | / |
| 4 | 0.05 | 100 | 50.3 | 0 | 0 | 0 |
| 5 | 0.05 | 150 | 26.2 | 0 | 0 | 0 |
| 6 | 0.05 | 175 | 19.4 | 0 | 0 | 0 |
| 7 | 0.2 | 100 | 50.3 | 0 | 0 | 0 |
| 8 | 0.2 | 150 | 26.2 | 0.265 | 0 | 0 |
| 9 | 0.2 | 175 | 19.4 | 0.458 | 0 | 0 |
| 10 | 0.5 | 100 | 50.3 | 0 | 0 | 0 |
| 11 | 0.5 | 150 | 26.2 | 0.320 | 0 | 0 |
| 12 | 0.5 | 175 | 19.4 | 0.74 | 0 | 0 |
| 13 | 1.4 | 100 | 50.3 | 0.157 | 0 | 0 |
| 14 | 1.4 | 150 | 26.2 | 0.821 | 0 | 0 |
| 15 | 1.4 | 175 | 19.4 | 1.10 | 0 | 0 |
| 16 | Old 0.05 | 100 | 50.3 | / | / | / |
| 17 | 0.05 | 175 | 19.4 | / | / | / |

Table 7 illustrates a series of experimental runs monitoring among others, reaction temperature, reactor pressure and the types of alcohol, oil and catalyst.

TABLE 7

Nineteen experimental runs.

| Run | Membrane MWCO (300 kD) | Alcohol | Lipid | catalyst | Initial volume ratio | Feeding molar ratio | Overall molar ratio | Reactor T (° C.) | Reactor P (psi) | NOTE |
|---|---|---|---|---|---|---|---|---|---|---|
| 1 | ATZ | 85%/15% ethyl alcohol | Canola | 1.08% base | 1 | 17 | 18 | 65 | 30-32 | |
| 2 | ATZ | Methanol | Canola | 1% base | 1 | 16.5 | 10.14 | 70 | 30 | |
| 3 | ATZ | Methanol | Canola | 1% base | 0.5 | 16.14 | 15.40 | 65 | 45 | |
| 4 | ATZ | Methanol | Canola | no | | | 20 | 65 | 45 | |
| 5 | ATZ | Methanol | Canola | NO | | | 20 | 65 | 45 | PUMP broken |
| 6 | ATZ | Methanol | Canola | 0.5% base | 1 | 20 | 20 | 65 | 45 | Res. time 3 hr |
| 7 | ATZ | Methanol | Canola | 0.5% base | 1 | 20 | 20 | 65 | 45 | Res. time 1 hr |
| 8 | ATZ | Methanol | Canola | NO | 1 | 20 | 20 | 65 | 45 | Res. time 1 hr |
| 9 | ATZ | Methanol | animal fat | 1% ACID | 1 | 20 | 20 | 65 | 30 | Res. time 3 hr |
| 10 | ATZ | Methanol | animal fat | 1% ACID | 1 | 20 | 20 | 70 | 30 | Res. time 3 hr |
| 11 | ATZ | Methanol | Canola | 1% base | 1 | 20 | 20 | 70 | 40 | Res. time 1 hr |
| 12 | ATZ | Recycle polar phase | Canola | 1% base | 1 | — | — | 70 | 40 | Res. time 1 hr |
| 13 | ATZ | Methanol | waste frying oil | 4% acid | 1 | 20 | 20 | 70 | 40 | Res. time 3 hr |
| 14 | ATZ | Methanol | waste frying oil | 4% acid | 2:1 | 48 | 48 | 70 | 40 | Res. time 4 hr |
| 15 | TIO2 | methanol | waste frying oil | 3% acid | 2:1 | 48 | 48 | 70 | 30 | Res. time 4 |
| 16 | TIO2 | 77.5/22.5 MeOH/EOH | waste frying oil | 1% base | 1 | 20 | 20 | 65 | 40 | Res. time 3 |
| 17 | $TIO_2$ | methanol | waste frying oil | 1% base | 1 | 20 | 40 | 70 | 50 | Res: time 3 |
| 18 | $TIO_2$ | methanol | waste frying oil | 1% base | 1.5:1 | 36 | 36 | 65 | 40 | Res. time 3 |
| 19 | $TIO_2$ | methanol | waste frying oil | No, FFA wash | 1 | 20 | — | 50/60 | 40 | Recycle permeate |

The results described in previous tables illustrate the flexibility of the apparatuses and methods of the present invention. For example a variety of membrane pore sizes, reaction temperatures and pressures have been analysed, each having varying degrees of success with regard to permeate production comprising FAAE with low levels of transesterfication intermediates.

In one exemplary semi-batch process, a large methanol:oil ratio was employed. From visual observations, the concentration of FAME in the permeate was not constant as the reaction progressed. Initially, the FAME permeate was quite concentrated but as the reaction proceeded, the FAME permeate concentration decreased. In a continuous process, oil and methanol can be fed to the reactor at a fixed ratio resulting in the continuous production of a concentrated permeate. The experiments outlined above illustrate that oil and methanol can readily co-exist in the reactor at a volume ratio of about 1:2 without plugging the membrane pores. This allows for the reaction to be carried out in an emulsion where oil and reacted products can be continuously separated in order to produce a TG-free FAME.

In most commercial processes, as the reaction progresses, the formed FAME will eventually behave as a mutual solvent for the TG and alcohol phases. Noureddini and Zhu (1997) have discussed the benefits of the formation of a homogeneous alcohol/TG/FAME phase as FAME is formed in the reaction. As discussed above, maintaining a two-phase system in the membrane reactor inhibits the transfer of TG and non-reacting lipids to the product stream. One of the benefits of producing a TG-free FAME is a simplification of the often onerous downstream purification of FAME. This, of course, leads to the production of high quality FAME. The membrane reactor allows a phase barrier which limits the presence of TG and non-reacting lipids in the product. This is highly desirable in maintaining quality assurance in the production of biodiesel. Maintaining a phase barrier prohibits the transfer of highly hydrophobic molecules to the product. This provides a limiting barrier in the production of biodiesel. This parallels the advantages of using distillation in maintaining product quality in the petroleum processing industries.

Like petroleum diesel, biodiesel such as FAAE operates in compression-ignition engines such as those used in farm equipment, and private and commercial vehicles. Essentially no engine modifications are required, and biodiesel maintains the payload capacity and range of diesel. Because biodiesel is oxygenated, it is a better lubricant than diesel fuel, increasing the life of engines, and is combusted more completely. Indeed, many countries are introducing biodiesel blends to replace the lubricating effect of sulfur compounds in low-sulfur diesel fuels (Anastopoulos et al., 2001; Dmytryshyn et al., 2004). The higher flash point of biodiesel makes it a safer fuel to use, handle and store. With its relatively low emission profile, it is an excellent fuel for use in sensitive environments, such as marine areas, national parks and forests, and heavily polluted cities.

Figure 12:
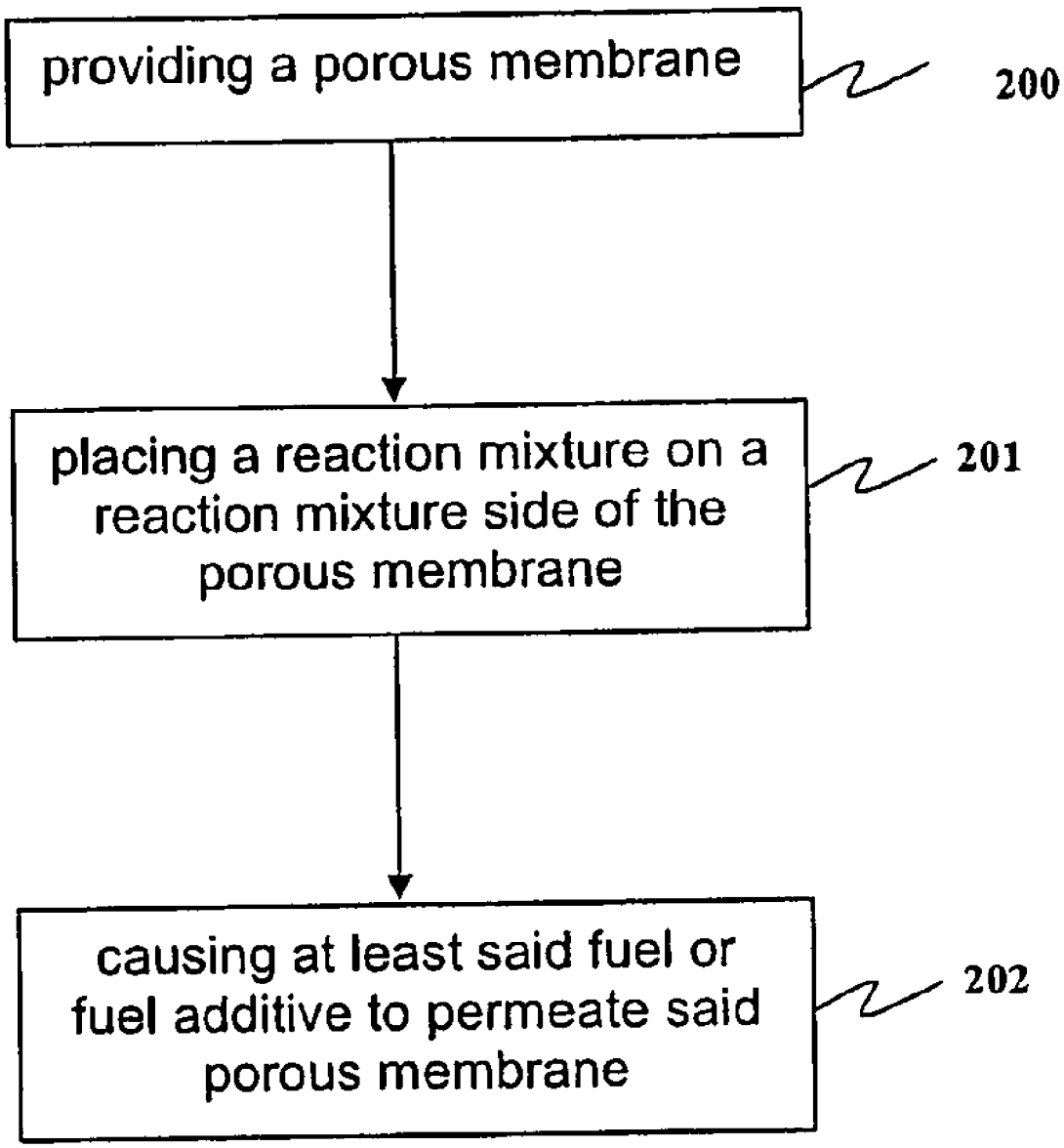
FIG. 12 provides an overview of an example method of the invention.

The present invention further encompasses the use of the apparatuses of the invention for the production of fuel or fuel additives suitable for use in a diesel engine. The invention further encompasses all methods involving for example the apparatuses of the invention for the production of fuel or fuel additives suitable for use in a diesel engine. One exemplary method of the invention is illustrated in FIG. 12. In this method for generating a fuel or fuel additive suitable for use in a diesel engine, the method comprises:

in step 200 providing a porous membrane;

in step 201 placing a reaction mixture on a reaction mixture side of the porous membrane, the reaction mixture comprising an oil-in-alcohol emulsion and a catalyst for converting oil in said oil-in-alcohol emulsion to products including said fuel or fuel additive, said fuel or fuel additive being substantially miscible in said alcohol, said porous membrane being substantially impermeable to oil droplets in said emulsion, and substantially permeable to said alcohol and said fuel or fuel additive; and in step 202 causing at least said fuel or fuel additive to permeate said porous membrane to form a permeate on a permeate side of said porous membrane opposite said reaction mixture side.

All aspects of the apparatuses of the invention as previously described and as outline in the claims apply to the methods of the invention as described herein.

In selected embodiments, the permeate may comprise glycerol, and the method may further comprise the step of:

cooling the permeate to cause phase separation of the glycerol into a separate phase. Methanol in the FAME rich phase may be recovered by evaporation and the FAME water washed to remove traces of glycerol. The methanol rich phase may, at least in preferred embodiments, be recycled to the reactor. On recycling, glycerol may be retained in the reactor and purged form the reactor loop along with unreactible substances in the feedstock.

Under certain operating conditions, glycerol has been observed to form a third, highly hydrophilic, phase in the reactor and be further retained. Its removal can be enhanced by taking advantage of the density difference (sg 1.2 for glycerol vs 0.79 for methanol and 0.88 for FAME) using a cyclone or vortex trap in the recycle loop.

Whilst the invention has been described with reference to specific embodiments and examples of apparatuses and methods for the production of fuels or fuel additives for use in a diesel engine, a person of skill in the art will appreciate that other similar apparatuses and methods are also within the scope of the invention, and it is the intention to encompass all such alternatives within the scope of the appended claims.

REFERENCES

1. Anastopoulos, G., Lois, E., Karonis, D., Zanikos, F., Kalligeros, S., 2001. A Preliminary Evaluation of Esters of Monocarboxylic Fatty Acid on the Lubrication Properties of Diesel Fuel. Ind. Eng. Chem. Res., 40, 452-456.
2. Armor, J. N., 1989. Catalysis with Permselective Inorganic Membranes. Appl. Cat., 49, 1-25.
3. Armor, J. N., 1998. Applications of Catalytic Inorganic Membrane Reactors to Refinery Products. J. Membrane Sci., 147, 217-233.
4. Bam, N., Drown, D. C., Korous, R., Hoffman, D. S., Johnson, T. G., Washam, J. M., 1995. Method for Purifying Alcohol Esters. U.S. Pat. No. 5,424,467, June 13.
5. Boocock, D. G. B., Konar, S. K, Mao, V., Lee, C., Buligan, S., 1998. Fast Formation of High-Purity Methyl Esters from Vegetable Oils. J. Am. Oil Chem. Soc., 75, 1167-1172.
6. Boocock, D. G. B., Konar, S. IC, Mao, V., Sidi, H., 1996. Fast One-phase Oil-Rich Processes for Preparation of Vegetable Oil Methyl Esters. Biomass and Bioenergy, 11, 43-50.
7. Canakci, K., Van Gerpen, J., 1999. Biodiesel Production via Acid Catalysis. Trans. ASAE, 42, 1230-1210.
8. Coltrain, D., 2002. Biodiesel: Is It Worth Considering. 2002 Risk and Profit Conference, Manhattan, Kans.
9. Darnoko, D., Cheryan, M., Perkins, E. G., 2000. Analysis of Vegetable Oil Transesterification Products by Gel Permeation Chromatography. J. Liq. Chrom. & Rel. Technol., 23, 2327-2335.
10. Dmytryshyn, S. L., Dalai, A. K., Chaudhari, S. T., Mishra, H. K., Reaney, M. J., 2004. Synthesis and Characterization of Vegetable Oil Derived Esters: Evaluation for Their Diesel Additive Properties, Biores. Tech., 92, 55-64.
11. Dubé, M. A., Zheng, S., McLean, D. D., Kates, M., 2004. A Comparison of Attenuated Total Reflectance-FTIR Spectroscopy and GPC for Monitoring Biodiesel Production. J. Am. Oil Soc. Chem., 81, 599-603.
12. Freedman, B., Pryde, E. H., Mounts, T. L., 1984. Variables Affecting the Yields of Fatty Esters from Transesterified Vegetable Oils. J. Am. Oil Chem. Soc., 61, 1638-1643.
13. Freedman, B., Buttterfield, R. O., Pryde, E. H., 1985. Transesterification Kinetics of Soybean Oil. J. Am. Oil Chem. Soc., 63, 1375-1380.
14. Hayafuji, S., Shimidzu, T., Ob, S., Zaima, H., 1999. Method and Apparatus for Producing Diesel Fuel Oil from Waste Edible Oil. U.S. Pat. No. 5,972,057, Oct. 26.
15. Hsieh, H. P., 1991. Inorganic Membrane Reactors. Cat. Rev.: Sci. Eng., 33, 1-70.
16. Hsieh, H. P., 1996. Inorganic Membranes for Separation and Reaction, Elsevier Science, Amsterdam.

17. Karaosmanoglu, F., Cigizoglu, K. B., Tuter, M., Eitekin, S., 1996. Investigation of the Refining Step of Biodiesel Production. Energy & Fuels, 10, 890-895.
18. Kim, I.-C., Kim, J.-H., Lee, K.-H., Tak, T.-M., 2002. Preparation and Properties of Soluble Copolysulfone-imide and Performance of Solvent-Resistant Ultrafiltration Membrane. J. Appl. Polym. Sci., 85, 1024-1030.
19. Liu, J., 2004. Biodiesel Production from Canola Oil Using a Membrane Reactor, M. A. Sc. thesis, Dept. of Chemical Engineering, University of Ottawa, Canada.
20. Liu, K., 1994. Preparation of Fatty Acid Methyl Esters for Gas-Chromatographic Analysis of Lipids in Biological Materials. J. Am. Oil Chem. Soc., 71, 1179-1187.
21. McBride, N., 1999. Modeling the Production of Biodiesel from Waste Frying Oil. B. A. Sc. thesis, Dept. of Chemical Engineering, University of Ottawa, Canada.
22. Noureddini, H., Zhu, D., 1997. Kinetics of Transesterification of Soybean Oil. J. Am. Oil Chem. Soc., 74, 1457-1463.
23. Nye, M. J., Williamson, T. W., Deshpande, S., Schrader, J. H., Snively, W. H., 1983. Conversion of Used Frying Oil to Diesel Fuel by Transesterification: Preliminary Test. J. Am. Oil Chem. Soc., 60, 1598-1601.
24. Ripmeester, W., 1998. Modeling the Production of Biodiesel from Waste Frying Oil. B. A. Sc. thesis, Dept. of Chemical Engineering, University of Ottawa, Canada.
25. Saracco, G., Neomagus, H. W. J. P., Versteeg, G. F., van Swaaij, W. P. M., 1999. High-Temperature Membrane Reactors: Potential and Problems. Chem. Eng. Sci., 54, 1997-2017.
26. Saracco, G., Specchia, V., 1994. Catalytic Inorganic-Membrane Reactors; Present Experience and Future Opportunities. Cat. Rev.: Sci. Eng., 36, 305-384.
27. Saracco, G., Versteeg, G. F., Van Swaajj, W. P. M., 1994. Current Hurdles to the Success of High Temperature Membrane Reactors. J. Membrane Sci., 95, 105-123.
28. Watanabe, Y., Shimada, Y., Sugihara, A., Tominaga, Y., 2001. Enzymatic Conversion of Waste Edible Oil to Biodiesel Fuel in a Fixed-bed Bioreactor. J. Am. Oil Chem. Soc. 78, 703-707.
29. White, L. S., Nitsch, A. R., 2000. Solvent Recovery from Lube Oil Filtrates with a Polyimide Membrane. 179, 267-274.
30. Zaman, J., Chakma, A., 1994. Inorganic Membrane Reactors. J. Membrane Sci., 92, 1-28.
31. Zhang, Y., Dubé, M. A., McLean, D. D., Kates, M., 2003a. Biodiesel Production from Waste Cooking Oil 1: Process Design and Technological Assessment. Biores. Tech., 89, 1-16.
32. Zhang, Y., Dube, M. A., McLean, D. D., Kates, M., 2003b. Biodiesel Production from Waste Cooking Oil 2: Economic Assessment and Sensitivity Analysis. Biores. Tech., 90, 229-240.
33. Zheng. S., 2003. Biodiesel Production from Waste Frying Oil: Conversion Monitoring and Modeling. M. A. Sc. Thesis, Dept. of Chemical Engineering, University of Ottawa, Canada.

The invention claimed is:

1. An apparatus for producing a biodiesel fuel or biodiesel fuel additive, the apparatus comprising:

a reactor configured as an unobstructed continuous flow through loop for circulating a reactive mixture therethrough, the reactor comprising a membrane module in open fluid communication within the continuous flow through loop and a reactive mixture circulating pump;

the membrane module comprising a porous membrane disposed therein as a cross flow filter, having a pore size of from 1 nm to 3 µm, for separating a permeate from the reactive mixture contained in the membrane module, the membrane having a permeate side and a reactive mixture side, the reactive mixture side facing the interior of the membrane module, said reactive mixture comprising an oil-in-alcohol emulsion and a catalyst for converting oil in said oil-in-alcohol emulsion to products including said fuel or fuel additive; said porous membrane being substantially impermeable to oil droplets in said emulsion, and substantially permeable at least to said fuel or fuel additive, and to said alcohol; said fuel or fuel additive being substantially miscible in the alcohol, the continuous flow through loop permitting continuous unobstructed circulation of reactive mixture past the reactive mixture side of the porous membrane to a location remote from the porous membrane, at least one supply conduit comprising a reactant feed pump and a feed line for supplying reactants directly into the reactor, said reactive mixture circulating pump comprising a centrifugal pump to circulate the reactive mixture through the continuous flow through loop of the reactor and past the reactive mixture side of the membrane, said reactive mixture circulating pump causing turbulence on the reactive mixture side of the porous membrane, a permeate removal conduit disposed on the permeate side of the porous membrane, for removing a permeate stream comprising said fuel or fuel additive from the permeate side of the porous membrane, and a control valve on the permeate removal conduit disposed on the permeate side of the porous membrane, to control the relative pressure between the permeate side and the reactive mixture side of the membrane.

2. The apparatus of claim 1, further comprising a reservoir in the continuous flow through loop for containing or temporarily holding a volume of one or more components of the reactive mixture in a location remote from the porous membrane.

3. A method for generating a biodiesel fuel or biodiesel fuel additive, the method comprising the steps of:

providing a reactor for containing a reactive mixture therein, comprising a porous membrane within a membrane module, said reactor being configured as an unobstructed continuous flow through loop for circulating the reactive mixture therethrough, said membrane module being in open fluid communication within the continuous flow through loop;

the membrane having a permeate side and a reactive mixture side, wherein the reactive mixture side faces the interior of the membrane module, the membrane having a pore size of from 1 nm to 3 µm;

pumping reactants directly into the reactor at a feeding molar ratio of from 10:1 to 50:1 of methanol: oil to form a reactive mixture comprising an oil-in-alcohol emulsion and a catalyst for converting oil in said oil-in-alcohol emulsion to products including said fuel or fuel additive, said fuel or fuel additive being substantially miscible in said alcohol, said porous membrane being substantially impermeable to oil droplets in said emulsion, and substantially permeable to said fuel or fuel additive, and to said alcohol;

continuously reacting the reactive mixture within the reactor at a temperature of at least 50 °C. and with a residence time within the reactor of up to 4 hours, to convert oil to said fuel or fuel additive;

continuously circulating the reactive mixture through the reactor and past the reactive mixture side of the membrane as a cross flow filter;

causing at least said fuel or fuel additive to permeate said porous membrane to form a permeate on a permeate side of said porous membrane opposite said reactive mixture side using a pressure differential across the membrane;

controlling the pressure differential across the membrane with a control valve disposed on the permeate side of the porous membrane, to decouple pressure in the continuous flow through loop from trans-membrane pressure;

continuously replenishing reactants into the reactor to maintain reaction of the oil-in-alcohol emulsion with the catalyst on the reactive mixture side of the membrane; and continuously withdrawing permeate from the permeate side of the membrane to obtain a permeate stream containing the fuel or fuel additive.

4. The method of claim 3, wherein said catalyst is a transesterification catalyst, and said oil includes any combination of monoglycerides (MG), diglycerides (DG), triglycerides (TG), such that transesterification of said MG, DG, and TG in said reactive mixture generates fatty acid alkyl esters (FAAE) as said fuel or fuel additive.

5. The method of claim 3, wherein pressure in the reactor ranges from 3 kPa-70,000 kPa.

6. The method of claim 3, wherein the step of pumping reactants into the reactor comprises supplying said reactive mixture or components of said reactive mixture to the reactive mixture side of said porous membrane with optional pre-mixing of the oil and alcohol.

7. The method of claim 6, wherein the step of pumping reactants into the reactor comprises pumping the reactive mixture to the reactive mixture side via a reactive mixture circulating pump, wherein said pump optionally causes turbulence in said reactive mixture.

8. The method of claim 6, further comprising one or more of the following steps:
recycling any alcohol in said permeate back to said reactive mixture;
recycling a FAME/alcohol fraction or an alcohol/catalyst fraction from phase separation of cooled permeate back to said reactive mixture; and
recycling catalyst back to said reactive mixture.

9. The method of claim 3, wherein the temperature of the reactive mixture is from 50° C. to 150° C.

10. The method of claim 3, further comprising a step of:
temporarily holding a volume of one or more components of the reactive mixture in a reservoir within the continuous flow through loop, located remote from the porous membrane.

11. The method of claim 3, further comprising: separating the permeate into a fuel-rich fraction, an alcohol-rich fraction, and optionally a glycerol-rich fraction.

12. The method of claim 3, wherein the step of continuously replenishing the oil-in-alcohol emulsion comprises replenishing the oil-in-alcohol emulsion in the continuous loop.

13. The apparatus of claim 1, additionally comprising a heat exchanger in the continuous flow through loop.

14. The apparatus of claim 1, wherein the control valve comprises a back pressure control valve.

15. The apparatus of claim 14, additionally comprising a heat exchanger disposed on the permeate side of the porous membrane between the permeate removal conduit and the back pressure control valve, to cool the permeate.

16. The method of claim 3, wherein the feeding molar ratio is from about 10:1 to about 20:1.

17. The method of claim 3, wherein the residence time is from 30 minutes to 4 hours.

18. The method of claim 11, wherein the alcohol-rich fraction or the glycerol-rich fraction is recycled back into the reactor at the step of pumping reactants.

19. The method of claim 3, wherein pressure within the reactor is from 137 kPa to 345 kPa higher than ambient pressure.

* * * * *